US008713283B2

(12) United States Patent
Sinclair

(10) Patent No.: US 8,713,283 B2
(45) Date of Patent: Apr. 29, 2014

(54) METHOD OF INTERFACING A HOST OPERATING THROUGH A LOGICAL ADDRESS SPACE WITH A DIRECT FILE STORAGE MEDIUM

(75) Inventor: Alan W. Sinclair, Falkirk (GB)

(73) Assignee: SanDisk Technologies Inc., Plano, TX (US)

( * ) Notice: Subject to any disclaimer, the term of this patent is extended or adjusted under 35 U.S.C. 154(b) by 736 days.

(21) Appl. No.: 11/760,469

(22) Filed: Jun. 8, 2007

(65) Prior Publication Data

US 2008/0307155 A1    Dec. 11, 2008

(51) Int. Cl.
*G06F 12/10* (2006.01)

(52) U.S. Cl.
USPC ............................ 711/202; 711/103; 707/824

(58) Field of Classification Search
USPC .......................... 711/205, 103, 202; 707/824
See application file for complete search history.

(56) References Cited

U.S. PATENT DOCUMENTS

| | | | |
|---|---|---|---|
| 5,570,315 A | 10/1996 | Tanaka et al. | |
| 5,774,397 A | 6/1998 | Endoh et al. | |
| 5,845,313 A * | 12/1998 | Estakhri et al. | 711/103 |
| 5,848,420 A * | 12/1998 | Xu | 1/1 |
| 6,046,935 A | 4/2000 | Takeuchi et al. | |
| 6,125,435 A * | 9/2000 | Estakhri et al. | 711/201 |
| 6,128,695 A * | 10/2000 | Estakhri et al. | 711/103 |
| 6,202,138 B1 * | 3/2001 | Estakhri et al. | 711/168 |
| 6,373,746 B1 | 4/2002 | Takeuchi et al. | |
| 6,456,528 B1 | 9/2002 | Chen | |
| 6,522,580 B2 | 2/2003 | Chen et al. | |
| 6,732,222 B1 * | 5/2004 | Garritsen et al. | 711/103 |
| 6,763,424 B2 | 7/2004 | Conley | |
| 6,771,536 B2 | 8/2004 | Li et al. | |
| 6,781,877 B2 | 8/2004 | Cernea et al. | |
| 6,842,843 B1 * | 1/2005 | Vishlitzky et al. | 711/209 |
| 6,928,426 B2 | 8/2005 | Dake | |
| 7,085,879 B2 * | 8/2006 | Aasheim et al. | 711/103 |
| 7,139,864 B2 | 11/2006 | Bennett | |
| 7,475,185 B2 | 1/2009 | Nakanishi et al. | |
| 7,627,733 B2 * | 12/2009 | Sinclair | 711/203 |
| 7,747,837 B2 * | 6/2010 | Gorobets et al. | 711/203 |
| 7,769,978 B2 * | 8/2010 | Gorobets et al. | 711/203 |
| 7,793,068 B2 * | 9/2010 | Sinclair et al. | 711/203 |
| 2002/0013871 A1 | 1/2002 | Kakiage | |
| 2003/0014278 A1 | 1/2003 | Park et al. | |

(Continued)

OTHER PUBLICATIONS

Andrew Birrell, Michael Isard, Chuck Thacker, and Ted Wobber. 2007. A design for high-performance flash disks. SIGOPS Oper. Syst. Rev. 41, 2 (Apr. 2007), 88-93.*

(Continued)

*Primary Examiner* — Sanjiv Shah
*Assistant Examiner* — Samuel Dillon
(74) *Attorney, Agent, or Firm* — Brinks Gilson & Lione

(57) ABSTRACT

A method and system for interfacing a system operating through a logical address space with a direct file storage (DFS) medium is disclosed. The method includes receiving data associated with addresses in a logical block address (LBA) format from a host system and generating file objects manageable by the DFS medium based on a determination of the correlation of the LBA data to host file data. The memory system includes non-volatile memory using the DFS format, an interface for receiving LBA format data, and a controller configured to communicate with the host via an LBA interface and generate file objects from the LBA format data correlated to the host application files usable by the memory system.

65 Claims, 13 Drawing Sheets

(56) References Cited

U.S. PATENT DOCUMENTS

| | | |
|---|---|---|
| 2003/0109093 A1 | 6/2003 | Harari et al. |
| 2005/0018527 A1* | 1/2005 | Gorobets ............... 365/232 |
| 2005/0055497 A1* | 3/2005 | Estakhri et al. ........... 711/103 |
| 2005/0141312 A1* | 6/2005 | Sinclair et al. ............ 365/222 |
| 2005/0141313 A1 | 6/2005 | Gorobets |
| 2005/0144357 A1 | 6/2005 | Sinclair |
| 2005/0144358 A1 | 6/2005 | Conley |
| 2005/0144360 A1* | 6/2005 | Bennett et al. ............ 711/103 |
| 2005/0144363 A1 | 6/2005 | Sinclair |
| 2005/0144365 A1 | 6/2005 | Gorobets |
| 2005/0144367 A1 | 6/2005 | Sinclair |
| 2005/0166087 A1 | 7/2005 | Gorobets |
| 2005/0182890 A1* | 8/2005 | Yamagami ............... 711/4 |
| 2005/0198425 A1 | 9/2005 | Wang |
| 2006/0004787 A1* | 1/2006 | Borthakur et al. ......... 707/100 |
| 2006/0020744 A1* | 1/2006 | Sinclair et al. ............ 711/103 |
| 2006/0020745 A1 | 1/2006 | Conley |
| 2006/0155920 A1 | 7/2006 | Smith |
| 2006/0155921 A1 | 7/2006 | Gorobets |
| 2006/0155922 A1 | 7/2006 | Gorobets |
| 2006/0184718 A1 | 8/2006 | Sinclair et al. |
| 2006/0184719 A1 | 8/2006 | Sinclair |
| 2006/0184720 A1 | 8/2006 | Sinclair et al. |
| 2006/0184722 A1 | 8/2006 | Sinclair |
| 2006/0184723 A1 | 8/2006 | Sinclair et al. |
| 2007/0030734 A1 | 2/2007 | Sinclair et al. |
| 2007/0033323 A1* | 2/2007 | Gorobets ............... 711/103 |
| 2007/0033324 A1 | 2/2007 | Sinclair |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033328 A1 | 2/2007 | Sinclair et al. |
| 2007/0033329 A1 | 2/2007 | Sinclair et al. |
| 2007/0033330 A1 | 2/2007 | Sinclair et al. |
| 2007/0033331 A1 | 2/2007 | Sinclair et al. |
| 2007/0033332 A1 | 2/2007 | Sinclair et al. |
| 2007/0033373 A1 | 2/2007 | Sinclair |
| 2007/0033374 A1 | 2/2007 | Sinclair et al. |
| 2007/0033375 A1 | 2/2007 | Sinclair et al. |
| 2007/0033376 A1 | 2/2007 | Sinclair et al. |
| 2007/0033377 A1 | 2/2007 | Sinclair et al. |
| 2007/0033378 A1 | 2/2007 | Sinclair et al. |
| 2007/0033413 A1* | 2/2007 | Terrell et al. ............ 713/183 |
| 2007/0086260 A1 | 4/2007 | Sinclair |
| 2007/0088904 A1 | 4/2007 | Sinclair |
| 2007/0136553 A1 | 6/2007 | Sinclair |
| 2007/0136555 A1 | 6/2007 | Sinclair |
| 2007/0143532 A1 | 6/2007 | Gorobets |
| 2007/0143570 A1 | 6/2007 | Gorobets |
| 2007/0143571 A1 | 6/2007 | Sinclair |
| 2007/0186032 A1 | 8/2007 | Sinclair |
| 2008/0155175 A1 | 6/2008 | Sinclair et al. |
| 2008/0155227 A1 | 6/2008 | Sinclair et al. |

OTHER PUBLICATIONS

Li-Pin Chang and Tei-Wei Kuo. 2005. Efficient management for large-scale flash-memory storage systems with resource conservation. Trans. Storage 1, 4 (Nov. 2005), 381-418.*

Understanding the flash translation layer (FTL) specification. Tech. Rep. AP-684, Intel Corporation, Dec. 1998.*

Atsuo Kawaguchi , Shingo Nishioka, Hiroshi Motoda. A flash-memory-based file system. 1995. In Proceedings of the 1995 USENIX Technical Conference.*

Co-pending U.S. Appl. No. 11/760,480, filed Jun. 8, 2007, entitled "System for Interfacing a Host Operating Through a Logical Address Space With a Direct File Storage Medium".

U.S. Appl. No. 11/616,242, filed Dec. 26, 2006, entitled "Use of a Direct Data File System With a Continuous Logical Address Space Interface".

U.S. Appl. No. 11/616,236, filed Dec. 26, 2006, entitled "System Using a Direct Data File System With a Continuous Logical Address Space Interface".

U.S. Appl. No. 11/616,231, filed Dec. 26, 2006, entitled "Configuration of Host LBA Interface With Flash Memory".

U.S. Appl. No. 11/616,228, filed Dec. 26, 2006, entitled "Host System With Direct Data File Interface Configurability".

U.S. Appl. No. 11/616,226, filed Dec. 26, 2006, entitled "Managing a LBA Interface in a Direct Data File Memory System".

U.S. Appl. No. 11/616,218, filed Dec. 26, 2006, entitled "Host System That Manages a LBA Interface With Flash Memory".

Office Action dated Jul. 7, 2009 for co-pending U.S. Appl. No. 11/760,480.

Office Action of U.S. Appl. No. 12/030,018, date mailed Nov. 9, 2010, 33 pages.

Office Action for U.S. Appl. No. 12/030,018, date mailed Oct. 13, 2011, 7 pages.

Office Action for U.S. Appl. No. 12/030,018, date mailed Jun. 28, 2012, 33 pages.

Notice of Allowance for U.S. Appl. No. 12/030,018, date mailed Apr. 2, 2012, 8 pages.

* cited by examiner

METHOD OF INTERFACING A HOST OPERATING THROUGH A LOGICAL ADDRESS SPACE WITH A DIRECT FILE STORAGE MEDIUM

CROSS-REFERENCE TO RELATED APPLICATIONS

Reference is made to the following United States patent applications pertaining to direct data file storage in flash memory systems:

1) Ser. No. 11/060,249, entitled "Direct Data File Storage in Flash Memories", Ser. No. 11/060,174, entitled "Direct File Data Programming and Deletion in Flash Memories", and Ser. No. 11/060,248, entitled "Direct Data File Storage Implementation Techniques in Flash Memories", all filed Feb. 16, 2005, and related application Ser. No. 11/342,170 and Ser. No. 11/342,168, both filed Jan. 26, 2006;

2) No. 60/705,388, filed Aug. 3, 2005, Ser. No. 11/461,997, entitled "Data Consolidation and Garbage Collection in Direct Data File Storage in Flash Memories," Ser. No. 11/462,007, entitled "Data Operations in Flash Memories Utilizing Direct Data File Storage," and related application Ser. Nos. 11/462,001 and 11/462,013, all filed Aug. 2, 2006.

3) Ser. No. 11/196,869, filed Aug. 3, 2005, entitled "Interfacing Systems Operating Through a Logical Address Space and on a Direct Data File Basis."

4) Ser. No. 11/196,168, filed Aug. 3, 2005, entitled "Method and System for Dual Mode Access for Storage Devices."

5) Ser. No. 11/250,299, entitled "Method of Storing Transformed Units of Data in a Memory System Having Fixed Sized Storage Blocks," and related application Ser. No. 11/250,794, both filed Oct. 13, 2005.

6) Ser. No. 11/259,423, entitled "Scheduling of Reclaim Operations in Non-Volatile Memory," and related application Ser. No. 11/259,439, both filed Oct. 25, 2005.

7) Ser. No. 11/302,764, entitled "Logically-Addressed File Storage Methods," and related application Ser. No. 11/300,568, both filed Dec. 13, 2005.

8) Ser. No. 11/316,577, entitled "Enhanced Host Interfacing Methods," and related application Ser. No. 11/316,578, both filed Dec. 21, 2005.

9) Ser. No. 11/314,842, filed Dec. 21, 2005, entitled "Dual Mode Access for Non-Volatile Storage Devices."

10) Ser. No. 11/313,567, entitled "Method and System for Accessing Non-Volatile Storage Devices," and related application Ser. No. 11/313,633, both filed Dec. 21, 2005.

11) Ser. No. 11/382,224, entitled "Management of Memory Blocks that Directly Store Data Files," and related application Ser. No. 11/382,228, both filed May 8, 2006.

12) Ser. No. 11/382,232, entitled "Reclaiming Data Storage Capacity in Flash Memories," and related application Ser. No. 11/382,235, both filed May 8, 2006.

13) No. 60/746,742, filed May 8, 2006, Ser. No. 11/459,255, entitled "Indexing of File Data in Reprogrammable Non-Volatile Memories that Directly Store Data Files," and related application Ser. No. 11/459,246, both filed Jul. 21, 2006.

14) No. 60/746,740, filed May 8, 2006, Ser. No. 11/459,268, entitled "Methods of Managing Blocks in Nonvolatile Memory," and related application Ser. No. 11/459,260, both filed Jul. 21, 2006.

15) Ser. No. 11/616,242, entitled "Use of a Direct Data File System with a Continuous Logical Address Space Interface", and related application Ser. Nos. 11/616,236; 11/616,231; 11/616,228; 11/616,226; and 11/616,218, all filed Dec. 26, 2006.

The above applications, collectively referred to herein as the "Direct Data File Storage Applications", and all patents, patent applications, articles and other publications, documents and things referenced subsequently herein are hereby incorporated by reference in their entirety for all purposes.

This application is also related to "System For Interfacing A Host Operating Through A Logical Address Space With A Direct File Storage Medium," U.S. patent application Ser. No. 11/760,480, filed herewith, which is hereby incorporated by reference.

TECHNICAL FIELD

This application relates generally to data communication between electronic systems having different interfaces. More specifically, this application relates to the operation of memory systems, such as re-programmable non-volatile semiconductor flash memory, and a host device to which the memory is connected or connectable.

BACKGROUND

When writing data to a conventional flash data memory system, a host typically assigns unique logical addresses to sectors, clusters or other units of data within a continuous virtual address space of the memory system. The host writes data to, and reads data from, addresses within the logical address space of the memory system. The memory system then commonly maps data between the logical address space and the physical blocks or metablocks of the memory, where data is stored in fixed logical groups corresponding to ranges in the logical address space. Generally, each fixed logical group is stored in a separate physical block of the memory system. The memory system keeps track of how the logical address space is mapped into the physical memory but the host is unaware of this. The host keeps track of the addresses of its data files within the logical address space but the memory system operates without knowledge of this mapping.

A drawback of memory systems that operate in a logical address space, also referred to as logical block address (LBA) format, is fragmentation. Data written by a host file system may often be fragmented in logical address space, where many fixed logical groups are only partially updated with new data. The fragmentation may occur as a result of cumulative fragmentation of free space by the host file system, and possibly even as a result of inherent fragmentation of individual files by the host file system. The fragmented logical groups will need to be rewritten in full in a different physical block. The process of rewriting the fragmented logical groups may involve copying unrelated data from the prior location of the logical group. This overhead can result in lower performance and reduced device lifetime for the memory system.

BRIEF SUMMARY

In order to address the need for improved memory system performance and to reduce fragmentation, a method of translating LBA format data from a host into an object-oriented storage management scheme utilized by a memory system is set forth.

According to a first aspect, a method of transferring data between a host system and a re-programmable non-volatile mass storage system is described. The method includes receiving data associated with addresses in a logical block address (LBA) format at the mass storage system from the host system. A group of data within the received data from the host system is assembled based on a correlation of the group of data to an application file on the host system. LBA addresses for the group of data are mapped to offset addresses within a data object identified by a unique filename and the group of data identified by the unique filename is directly translated into physical addresses of blocks of memory cells. According to a second aspect, a method of transferring data between a host system and a re-programmable non-volatile mass storage system is described where the mass storage system receives data associated with addresses in a logical block address (LBA) format from the host system. The mass storage system selects, based on information from the host system, a correlation method to determine a correlation of received data to host system application files and determines a correlation of a group of the received data to a host system application file. LBA addresses for the group of data are mapped to offset addresses within a data object identified by a unique filename.

According to a third aspect, a method of transferring data between a host system and a re-programmable non-volatile mass storage system is described where the mass storage system receives data associated with addresses in a logical block address (LBA) format at the mass storage system from the host system, and determines if there is a correlation of a group of the received data to a host system application file. If the correlation is determined, the mass storage system assigns a unique file name to the group received data and maps LBA addresses for the group of data to the unique file name and a data offset. If the correlation is not determined, the mass storage system assigns the unique file name to a contiguous range of LBA addresses in the received data and maps the contiguous range of LBA addresses to the unique file name and a data offset. The data represented by the unique filename and data offset is then directly translated into physical addresses of blocks of memory cells in the mass storage system.

According to a another aspect, a method of transferring data between a host system and a re-programmable non-volatile mass storage system is described where the mass storage system determines if the host system is configured to provide host system file identifiers, indicative of a correlation of subsequently transmitted LBA data to application files on the host system, prior to writing logical block address (LBA) format data. If the host system is so configured, the mass storage system receives a host system file identifier as well as a group of data associated with addresses in a logical block address (LBA) format from the host system and with the host system file identifier. The host system file identifier is then mapped to a unique file name and LBA addresses for the received data are mapped to offset addresses in a data object identified by a unique filename. If the host system is not configured to provide host system file identifiers, then the mass storage system automatically correlates received LBA format data to application files on the host system without host system file identifiers, assigns a unique filename to a group of received data determined to correlate to an application file; and maps LBA addresses for the received data to offset addresses in a data object identified by a unique filename.

The step of automatically correlating received LBA format data may include analyzing activity of a host system operating system to determine the correlation of the group of data to the application file on the host system. The analysis of host operating system activity may include one or more of analyzing pre-data write activity, LBA address transition information, preceding write activity to the directory or file allocation table (FAT) LBA addresses, or the sequence of read or write operations of file metadata.

Other features and advantages of the invention will become apparent upon review of the following drawings, detailed description and claims.

BRIEF DESCRIPTION OF THE DRAWINGS

FIG. 10 illustrates, in a different manner than FIG. 9, a direct data file storage interface between a host and a re-programmable memory system.

DETAILED DESCRIPTION

A flash memory system suitable for use in implementing aspects of the invention is shown in FIGS. 1-6. A host system 1 of FIG. 1 stores data into and retrieves data from a flash memory 2. Although the flash memory can be embedded within the host, such as in the form of a solid state disk drive installed in a personal computer, the memory 2 is illustrated to be in the form of a card that is removably connected to the host through mating parts 3 and 4 of a mechanical and electrical connector. There are currently many different flash memory cards that are commercially available, examples being the CompactFlash™ (CF), the MultiMediaCard (MMC), Secure Digital (SD), miniSD, Memory Stick™, SmartMedia and TransFlash cards. Although each of these cards has a unique mechanical and/or electrical interface according to its standardized specifications, the flash memory system included in each is similar. These cards are all available from SanDisk Corporation, assignee of the present application. SanDisk also provides a line of flash drives under its Cruzer™ trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged. The memory system usually contains its own memory controller and drivers but there are also some memory-only systems that are instead controlled by software executed by the host to which the memory is connected. In some memory systems containing the controller, especially those embedded within a host, the memory, controller and drivers are often formed on a single integrated circuit chip.

Figure 1:
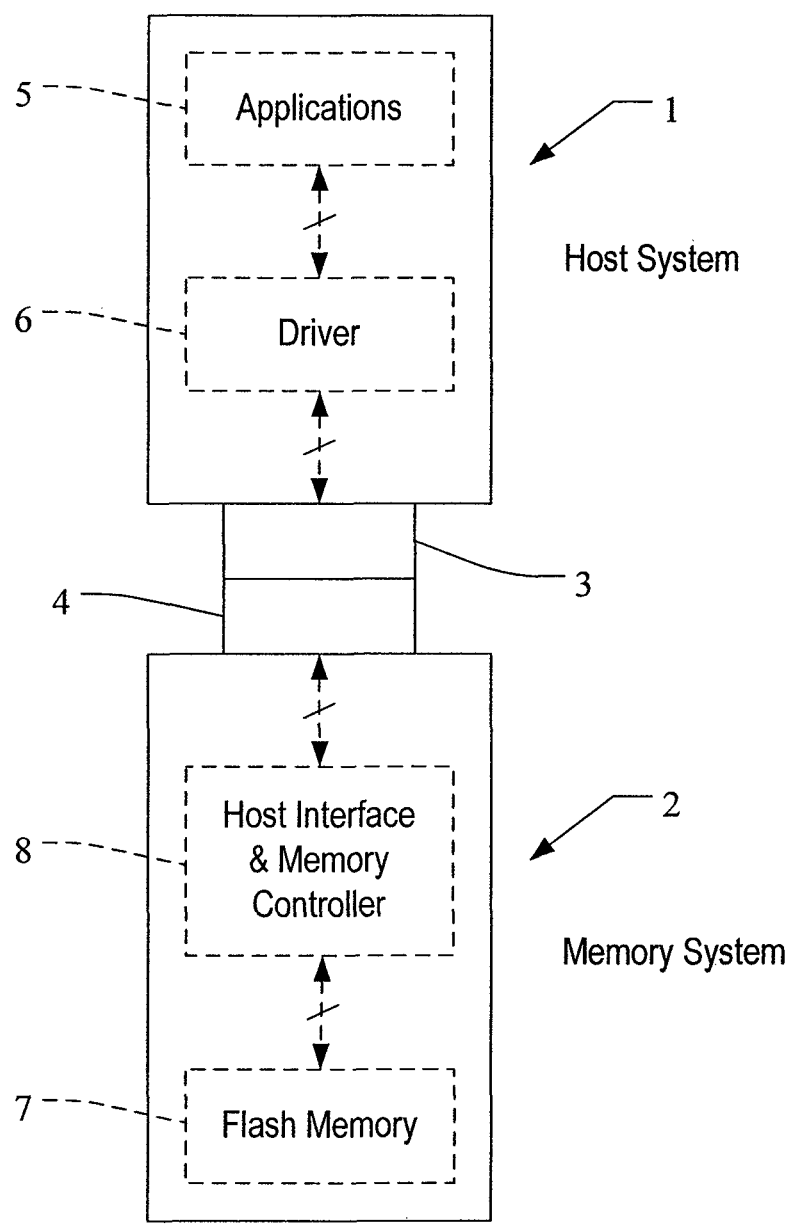
FIG. 1 schematically illustrates a host and a connected non-volatile memory system as currently implemented.

The host system 1 of FIG. 1 may be viewed as having two major parts, insofar as the memory 2 is concerned, made up of a combination of circuitry and software. They are an applications portion 5 and a driver portion 6 that interfaces with the memory 2. In a personal computer, for example, the applications portion 5 can include a processor running word processing, graphics, control or other popular application software. In a camera, cellular telephone or other host system that is primarily dedicated to performing a single set of functions, the applications portion 5 includes the software that operates the camera to take and store pictures, the cellular telephone to make and receive calls, and the like.

The memory system 2 of FIG. 1 includes flash memory 7, and circuits 8 that both interface with the host to which the card is connected for passing data back and forth and control the memory 7. The controller 8 typically converts between logical addresses of data used by the host 1 and physical addresses of the memory 7 during data programming and reading.

Figure 2:
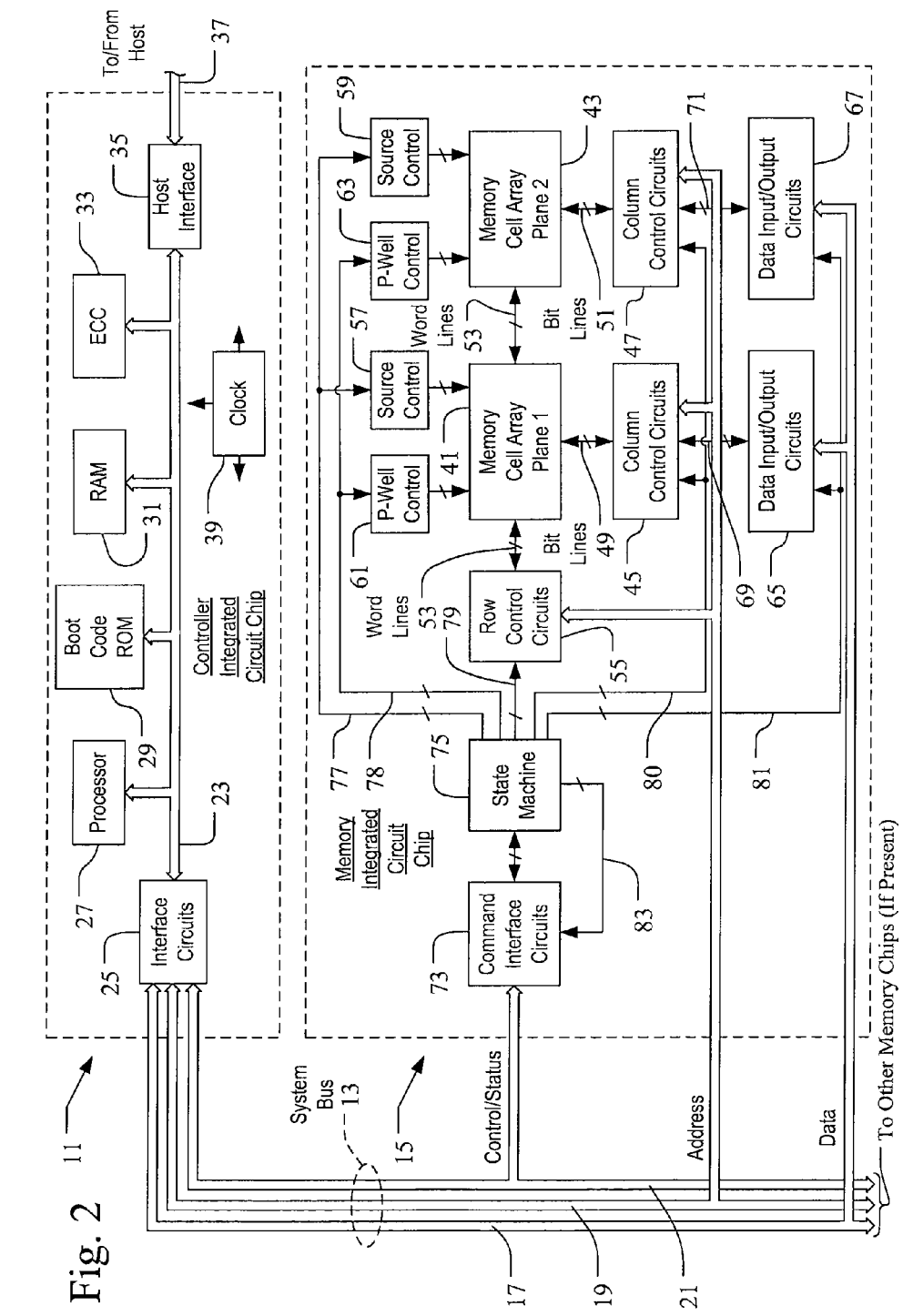
FIG. 2 is a block diagram of an example flash memory system for use as the non-volatile memory of FIG. 1.

Referring to FIG. 2, circuitry of a typical flash memory system that may be used as the non-volatile memory 2 of FIG. 1 is described. The system controller is usually implemented on a single integrated circuit chip 11 that is connected in parallel with one or more integrated circuit memory chips over a system bus 13, a single such memory chip 15 being shown in FIG. 2. The particular bus 13 that is illustrated includes a separate set of conductors 17 to carry data, a set 19 for memory addresses and a set 21 for control and status signals. Alternatively, a single set of conductors may be time shared between these three functions. Further, other configurations of system buses can be employed, such as a ring bus that is described in U.S. patent application Ser. No. 10/915, 039, filed Aug. 9, 2004, entitled "Ring Bus Structure and It's Use in Flash Memory Systems."

A typical controller chip 11 has its own internal bus 23 that interfaces with the system bus 13 through interface circuits 25. The primary functions normally connected to the bus are a processor 27 (such as a microprocessor or micro-controller), a read-only-memory (ROM) 29 containing code to initialize ("boot") the system, random-access-memory (RAM) 31 used primarily to buffer data being transferred between the memory and a host, and circuits 33 that calculate and check an error correction code (ECC) for data passing through the controller between the memory and the host. The controller bus 23 interfaces with a host system through circuits 35, which, in the case of the system of FIG. 2 being contained within a memory card, is done through external contacts 37 of the card that are part of the connector 4. A clock 39 is connected with and utilized by each of the other components of the controller 11.

The memory chip 15, as well as any other connected with the system bus 13, may contain an array of memory cells organized into multiple sub-arrays or planes, two such planes 41 and 43 being illustrated for simplicity but more, such as four or eight such planes, may instead be used. Alternatively, the memory cell array of the chip 15 may not be divided into planes. When so divided however, each plane has its own column control circuits 45 and 47 that are operable independently of each other. The circuits 45 and 47 receive addresses of their respective memory cell array from the address portion 19 of the system bus 13, and decode them to address a specific one or more of respective bit lines 49 and 51. The word lines 53 are addressed through row control circuits 55 in response to addresses received on the address bus 19. Source voltage control circuits 57 and 59 are also connected with the respective planes, as are p-well voltage control circuits 61 and 63. If the memory chip 15 has a single array of memory cells, and if two or more such chips exist in the system, the array of each chip may be operated similarly to a plane or sub-array within the multi-plane chip described above.

Data are transferred into and out of the planes 41 and 43 through respective data input/output circuits 65 and 67 that are connected with the data portion 17 of the system bus 13. The circuits 65 and 67 provide for both programming data into the memory cells and for reading data from the memory cells of their respective planes, through lines 69 and 71 connected to the planes through respective column control circuits 45 and 47.

Although the controller 11 controls the operation of the memory chip 15 to program data, read data, erase and attend to various housekeeping matters, each memory chip also contains some controlling circuitry that executes commands from the controller 11 to perform such functions. Interface circuits 73 are connected to the control and status portion 21 of the system bus 13. Commands from the controller are provided to a state machine 75 that then provides specific control of other circuits in order to execute these commands. Control lines 77-81 connect the state machine 75 with these other circuits as shown in FIG. 2. Status information from the state machine 75 is communicated over lines 83 to the interface 73 for transmission to the controller 11 over the bus portion 21.

A NAND architecture of the memory cell arrays 41 and 43 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States patent application publication no. 2003/0147278.

Figure 3:
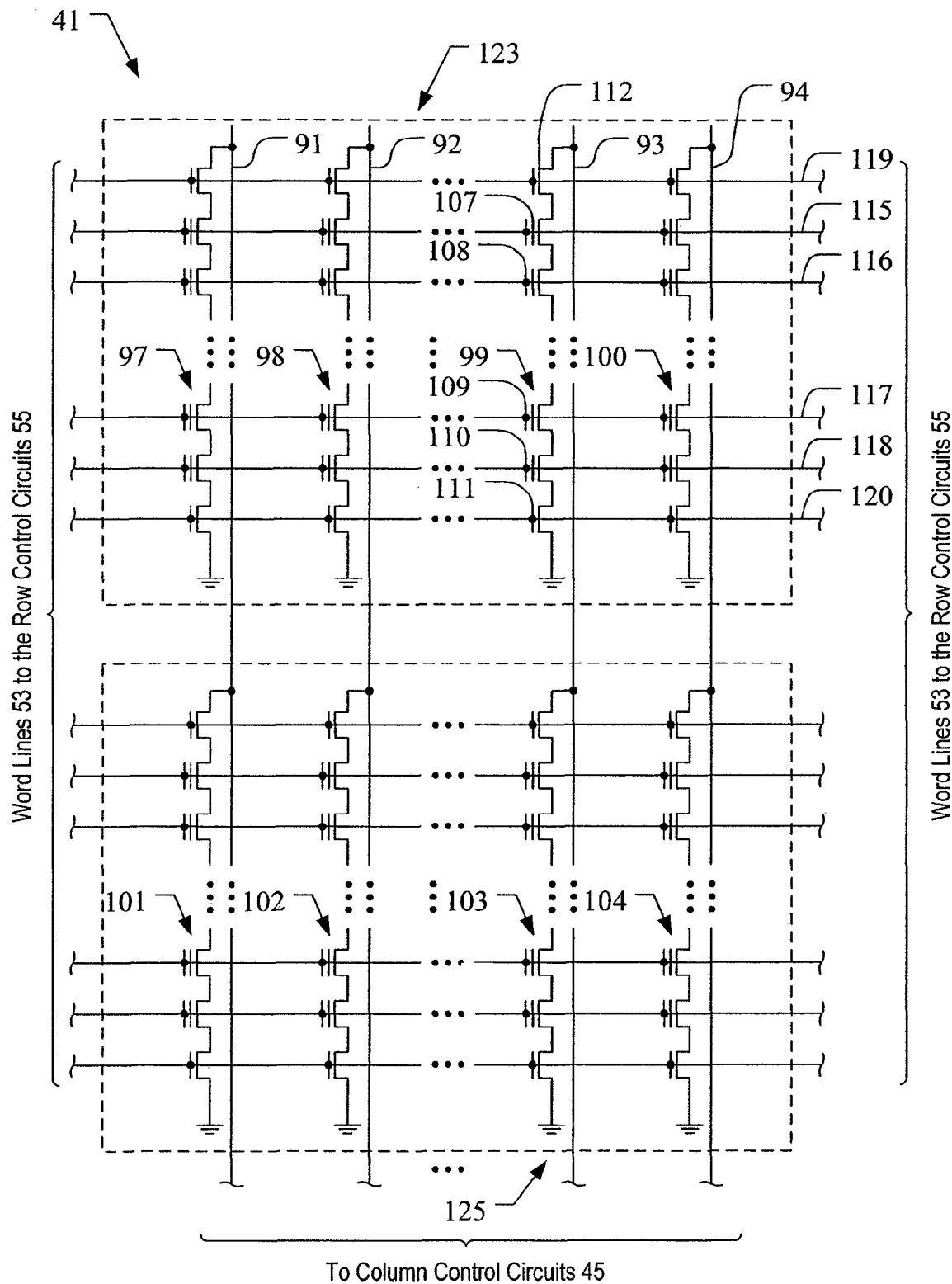
FIG. 3 is a representative circuit diagram of a memory cell array that may be used in the system of FIG. 2.

An example NAND array is illustrated by the circuit diagram of FIG. 3, which is a portion of the memory cell array 41 of the memory system of FIG. 2. A large number of global bit lines are provided, only four such lines 91-94 being shown in FIG. 2 for simplicity of explanation. A number of series connected memory cell strings 97-104 are connected between one of these bit lines and a reference potential. Using the memory cell string 99 as representative, a plurality of charge storage memory cells 107-110 are connected in series with select transistors 111 and 112 at either end of the string. When the select transistors of a string are rendered conductive, the string is connected between its bit line and the reference potential. One memory cell within that string is then programmed or read at a time.

Word lines 115-118 of FIG. 3 individually extend across the charge storage element of one memory cell in each of a number of strings of memory cells, and gates 119 and 120 control the states of the select transistors at each end of the strings. The memory cell strings that share common word and control gate lines 115-120 are made to form a block 123 of memory cells that are erased together. This block of cells contains the minimum number of cells that are physically erasable at one time. One row of memory cells, those along one of the word lines 115-118, are programmed at a time. Typically, the rows of a NAND array are programmed in a prescribed order, in this case beginning with the row along the word line 118 closest to the end of the strings connected to ground or another common potential. The row of memory cells along the word line 117 is programmed next, and so on, throughout the block 123. The row along the word line 115 is programmed last.

A second block 125 is similar, its strings of memory cells being connected to the same global bit lines as the strings in the first block 123 but having a different set of word and control gate lines. The word and control gate lines are driven to their proper operating voltages by the row control circuits 55. If there is more than one plane or sub-array in the system, such as planes 1 and 2 of FIG. 2, one memory architecture uses common word lines extending between them. There can alternatively be more than two planes or sub-arrays that share common word lines. In other memory architectures, the word lines of individual planes or sub-arrays are separately driven.

As described in several of the NAND patents and published application referenced above, the memory system may be operated to store more than two detectable levels of charge in each charge storage element or region, thereby to store more than one bit of data in each. The charge storage elements of the memory cells are most commonly conductive floating gates but may alternatively be non-conductive dielectric charge trapping material, as described in U.S. patent application publication no. 2003/0109093.

Figure 4:
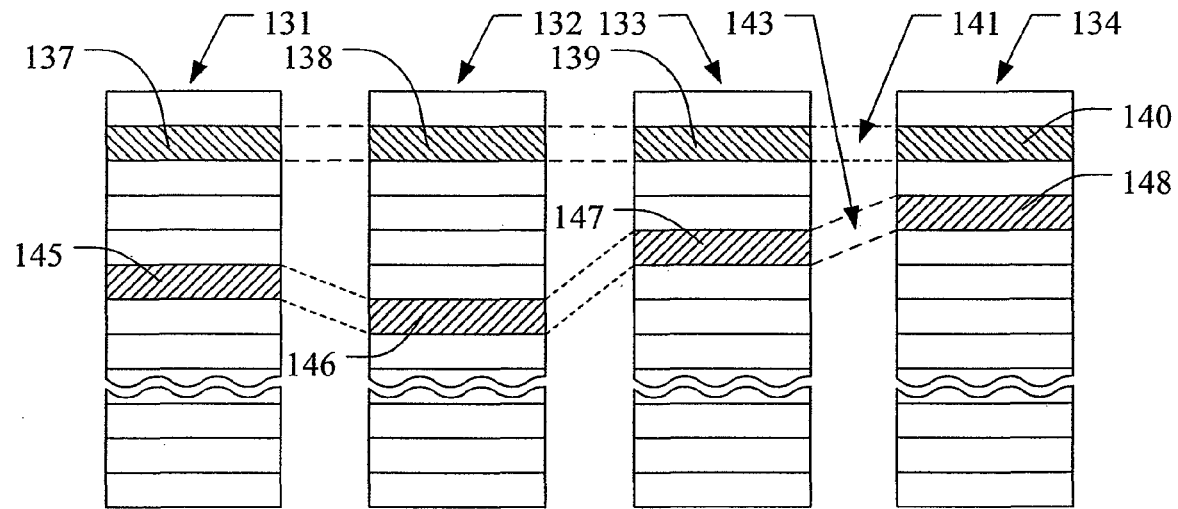
FIG. 4 illustrates an example physical memory organization of the system of FIG. 2.

FIG. 4 conceptually illustrates an organization of the flash memory cell array 7 (FIG. 1) that is used as an example in further descriptions below. Four planes or sub-arrays 131-134 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 4 by rectangles, such as blocks 137, 138, 139 and 140, located in respective planes 131-134. There can be dozens or hundreds of blocks in each plane.

As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 137-140 are shown to form one metablock 141. All of the cells within a metablock are typically erased together. The blocks used to form a metablock need not be restricted to the same relative locations within their respective planes, as is shown in a second metablock 143 made up of blocks 145-148. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 5:
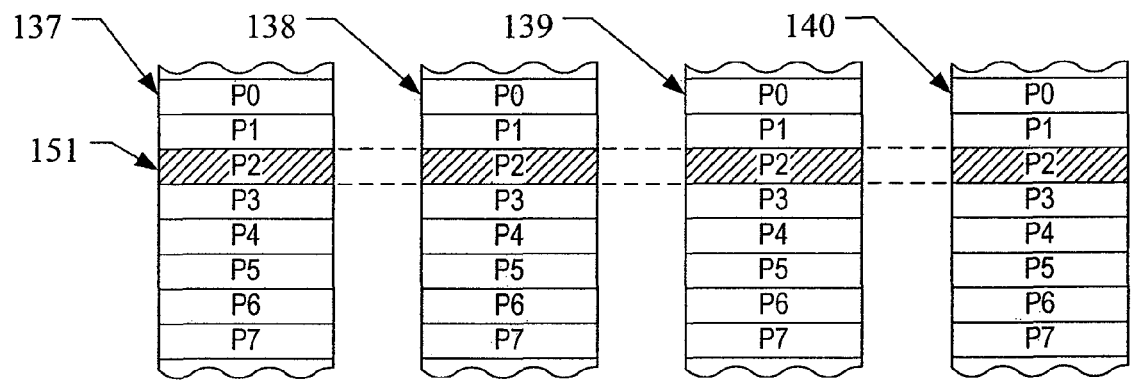
FIG. 5 shows an expanded view of a portion of the physical memory of FIG. 4.

The individual blocks are in turn divided for operational purposes into pages of memory cells, as illustrated in FIG. 5. The memory cells of each of the blocks 137-140, for example, are each divided into eight pages P0-P7. Alternatively, there may be 16, 32 or more pages of memory cells within each block. The page is the unit of data programming and reading within a block, containing the minimum amount of data that are programmed or read at one time. In the NAND architecture of FIG. 3, a page is formed of memory cells along a word line within a block. However, in order to increase the memory system operational parallelism, such pages within two or more blocks may be logically linked into metapages. A metapage 151 is illustrated in FIG. 5, being formed of one physical page from each of the four blocks 137-140. The metapage 151, for example, includes the page P2 in of each of the four blocks but the pages of a metapage need not necessarily have the same relative position within each of the blocks. A metapage is the maximum unit of programming.

Although it is preferable to program and read the maximum amount of data in parallel across all four planes, for high system performance, the memory system can also be operated to form metapages of any or all of one, two or three pages in separate blocks in different planes. This allows the programming and reading operations to adaptively match the amount of data that may be conveniently handled in parallel and reduces the occasions when part of a metapage remains unprogrammed with data.

A metapage formed of physical pages of multiple planes, as illustrated in FIG. 5, contains memory cells along word line rows of those multiple planes. Rather than programming all of the cells in one word line row at the same time, they are more commonly alternately programmed in two or more interleaved groups, each group storing a page of data (in a single block) or a metapage of data (across multiple blocks). By programming alternate memory cells at one time, a unit of peripheral circuits including data registers and a sense amplifier need not be provided for each bit line but rather are time-shared between adjacent bit lines. This economizes on the amount of substrate space required for the peripheral circuits and allows the memory cells to be packed with an increased density along the rows. Otherwise, it is preferable to simultaneously program every cell along a row in order to maximize the parallelism available from a given memory system.

With reference to FIG. 3, the simultaneous programming of data into every other memory cell along a row is most conveniently accomplished by providing two rows of select transistors (not shown) along at least one end of the NAND strings, instead of the single row that is shown. The select transistors of one row then connect every other string within a block to their respective bit lines in response to one control signal, and the select transistors of the other row connect intervening every other string to their respective bit lines in response to another control signal. Two pages of data are therefore written into each row of memory cells.

Figure 6:
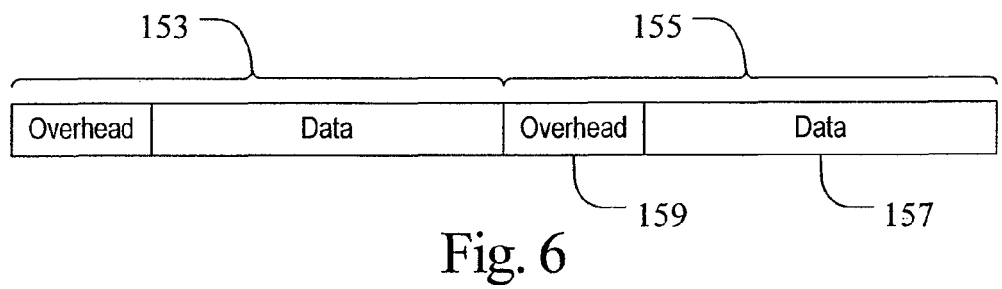
FIG. 6 shows a further expanded view of a portion of the physical memory of FIGS. 4 and 5.

The amount of data in each logical page is typically an integer number of one or more sectors of data, each sector containing 512 bytes of data, by convention. The sector is the minimum unit of data transferred to and from the memory system. FIG. 6 shows a logical data page of two sectors 153 and 155 of data of a page or metapage. Each sector usually contains a portion 157 of 512 bytes of user or system data being stored and another number of bytes 159 for overhead data related either to the data in the portion 157 or to the physical page or block in which it is stored. The number of bytes of overhead data is typically 16 bytes, making the total 528 bytes for each of the sectors 153 and 155. The overhead portion 159 may contain an ECC calculated from the data portion 157 during programming, its logical address, an experience count of the number of times the block has been erased and re-programmed, one or more control flags, operating voltage levels, and/or the like, plus an ECC calculated from such overhead data 159. Alternatively, the overhead data 159, or a portion of it, may be stored in different pages in other blocks. In either case, a sector denotes a unit of stored data with which an ECC is associated.

As the parallelism of memories increases, data storage capacity of the metablock increases and the size of the data page and metapage also increase as a result. The data page may then contain more than two sectors of data. With two sectors in a data page, and two data pages per metapage, there are four sectors in a metapage. Each metapage thus stores 2048 bytes of data. This is a high degree of parallelism, and can be increased even further as the number of memory cells in the rows is increased. For this reason, the width of flash memories is being extended in order to increase the amount of data in a page and a metapage.

The physically small re-programmable non-volatile memory cards and flash drives identified above are commercially available with various data storage capacities. The host manages data files generated or used by application software or firmware programs executed by the host. Word processing data files and drawing files of computer aided design (CAD) software are examples of data files generated by application software in general computer hosts such as PCs, laptop computers and the like. A digital camera generates a data file for each picture that is stored on a memory card. A cellular telephone utilizes data from files on an internal memory card, such as a telephone directory. A PDA stores and uses several different files, such as an address file, a calendar file, and the like. In any such application, the memory card may also contain software that operates the host.

Figure 7:
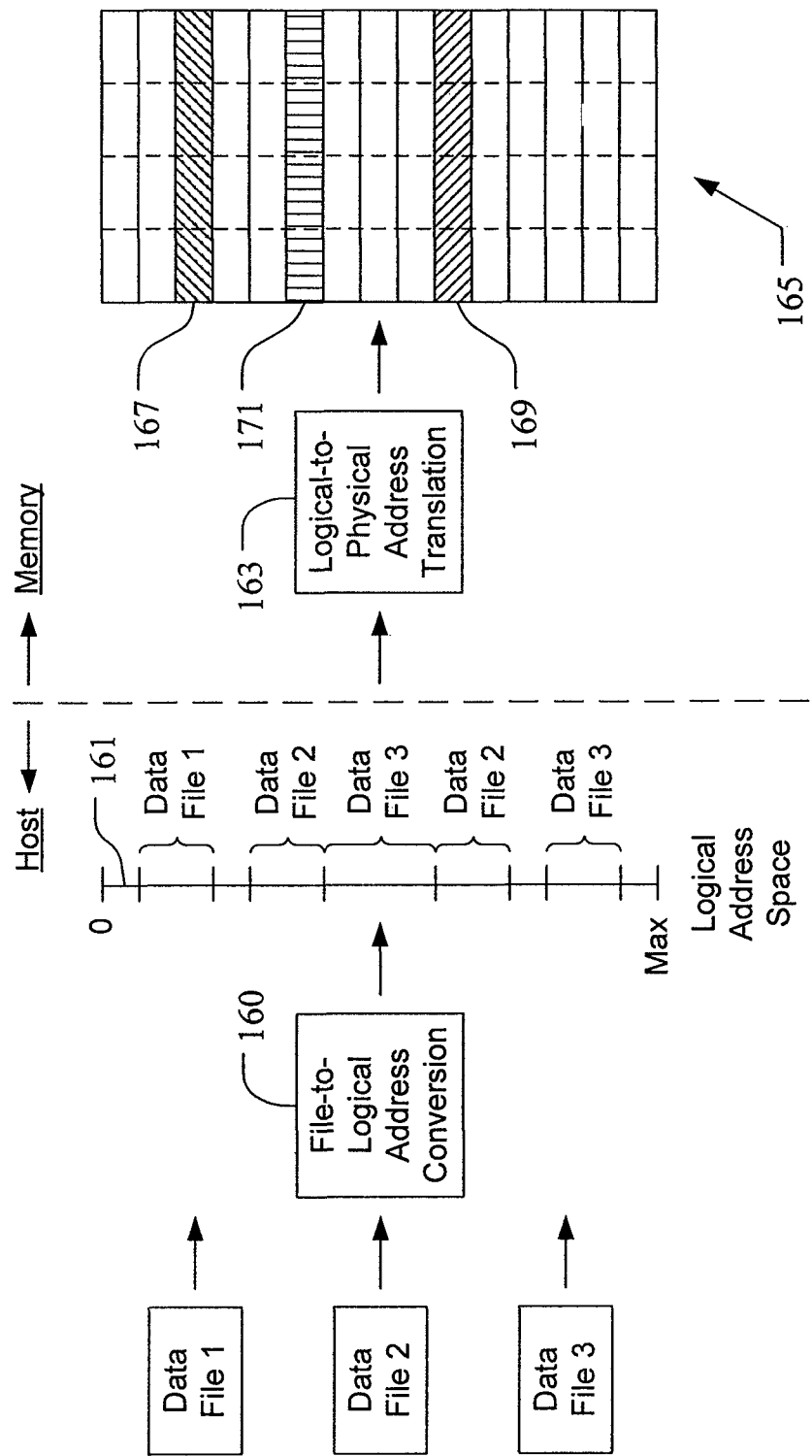
FIG. 7 illustrates a logical address space interface between a host and a re-programmable memory system.

A common logical interface between the host and the memory system is illustrated in FIG. 7. A continuous logical address space 161 is large enough to provide addresses for all the data that may be stored in the memory system. The host address space is typically divided into increments of clusters of data. Each cluster may be designed in a given host system to contain a number of sectors of data, somewhere between 4 and 64 sectors being typical. A standard sector contains 512 bytes of data.

Three Data Files 1, 2 and 3 are shown in the example of FIG. 7 to have been created. An application program running on the host system creates each file as an ordered set of data and identifies it by a unique name or other reference. Enough available logical address space not already allocated to other files is assigned by the host to Data File 1, by a file-to-logical address conversion 160. Data File 1 is shown to have been assigned a contiguous range of available logical addresses. Ranges of addresses are also commonly allocated for specific purposes, such as a particular range for the host operating software, which are then avoided for storing data even if these addresses have not been utilized at the time the host is assigning logical addresses to the data.

When a Data File 2 is later created by the host, the host similarly assigns two different ranges of contiguous addresses within the logical address space 161, by the file-to-logical address conversion 160 of FIG. 7. A file need not be assigned contiguous logical addresses but rather can be fragments of addresses in between address ranges already allocated to other files. This example then shows that yet another Data File 3 created by the host is allocated other portions of the host address space not previously allocated to the Data Files 1 and 2 and other data.

The host keeps track of the memory logical address space by maintaining a file allocation table (FAT), where the logical addresses assigned by the host to the various host files by the conversion 160 are maintained. The FAT table is frequently updated by the host as new files are stored, other files deleted, files modified and the like. The FAT table is typically stored in a host memory, with a copy also stored in the non-volatile memory that is updated from time to time. The copy is typically accessed in the non-volatile memory through the logical address space just like any other data file. When a host file is deleted, the host then deallocates the logical addresses previously allocated to the deleted file by updating the FAT table to show that they are now available for use with other data files.

The host is not concerned about the physical locations where the memory system controller chooses to store the files. The typical host only knows its logical address space and the logical addresses that it has allocated to its various files. The memory system, on the other hand, through the typical host/card interface being described, only knows the portions of the logical address space to which data have been written but does not know the logical addresses allocated to specific host files, or even the number of host files. The memory system controller converts the logical addresses provided by the host for the storage or retrieval of data into unique physical addresses within the flash memory cell array where host data are stored. A block 163 represents a working table of these logical-to-physical address conversions, which is maintained by the memory system controller.

The memory system controller is programmed to store data within the blocks and metablocks of a memory array 165 in a manner to maintain the performance of the system at a high level. Four planes or sub-arrays are used in this illustration. Data are preferably programmed and read with the maximum degree of parallelism that the system allows, across an entire metablock formed of a block from each of the planes. At least one metablock 167 is usually allocated as a reserved block for storing operating firmware and data used by the memory controller. Another metablock 169, or multiple metablocks, may be allocated for storage of host operating software, the host FAT table and the like. Most of the physical storage space remains for the storage of data files. The memory controller does not know, however, how the data received has been allocated by the host among its various file objects. All the memory controller typically knows from interacting with the host is that data written by the host to specific logical addresses are stored in corresponding physical addresses as maintained by the controller's logical-to-physical address table 163.

In a typical memory system, a few extra blocks of storage capacity are provided than are necessary to store the amount of data within the address space 161. One or more of these extra blocks may be provided as redundant blocks for substitution for other blocks that may become defective during the lifetime of the memory. The logical grouping of blocks contained within individual metablocks may usually be changed for various reasons, including the substitution of a redundant block for a defective block originally assigned to the metablock. One or more additional blocks, such as metablock 171, are typically maintained in an erased block pool. Most of the remaining metablocks shown in FIG. 7 are used to store host data. When the host writes data to the memory system, the function 163 of the controller converts the logical addresses assigned by the host to physical addresses within a metablock in the erased block pool. Other metablocks not being used to store data within the logical address space 161 are then erased and designated as erased pool blocks for use during a subsequent data write operation. In a preferred form, the logical address space is divided into logical groups that each contain an amount of data equal to the storage capacity of a physical memory metablock, thus allowing a one-to-one mapping of the logical groups into the metablocks.

Data stored at specific host logical addresses are frequently overwritten by new data as the original stored data become obsolete. The memory system controller, in response, writes the new data in an erased block and then changes the logical-to-physical address table for those logical addresses to identify the new physical block to which the data at those logical addresses are stored. The blocks containing the original data at those logical addresses are then erased and made available for the storage of new data. Such erasure often must take place before a current data write operation may be completed if there is not enough storage capacity in the pre-erased blocks from the erase block pool at the start of writing. This can adversely impact the system data programming speed. The memory controller typically learns that data at a given logical address has been rendered obsolete by the host only when the host writes new data to their same logical address. Many blocks of the memory can therefore be storing such invalid data for a time.

The sizes of blocks and metablocks are increasing in order to efficiently use the area of the integrated circuit memory chip. This results in a large proportion of individual data writes storing an amount of data that is less than the storage capacity of a metablock, and in many cases even less than that of a block. Since the memory system controller normally directs new data to an erased pool metablock, this can result in portions of metablocks going unfilled. If the new data are updates of some data stored in another metablock, remaining valid metapages of data from that other metablock having logical addresses contiguous with those of the new data metapages are also desirably copied in logical address order into the new metablock. The old metablock may retain other valid data metapages. This results over time in data of certain metapages of an individual metablock being rendered obsolete and invalid, and replaced by new data with the same logical address being written to a different metablock.

In order to maintain enough physical memory space to store data over the entire logical address space 161, such data are periodically compacted or consolidated (garbage collection). It is also desirable to maintain sectors of data within the metablocks in the same order as their logical addresses as much as practical, since this makes reading data in contiguous logical addresses more efficient. So data compaction and garbage collection are typically performed with this additional goal. Some aspects of managing a memory when receiving partial block data updates and the use of metablocks are described in U.S. Pat. No. 6,763,424.

Data compaction typically involves reading all valid data metapages from a metablock and writing them to a new block, ignoring metapages with invalid data in the process. The metapages with valid data are also preferably arranged with a physical address order that matches the logical address order of the data stored in them. The number of metapages occupied in the new metablock will be less than those occupied in the old metablock since the metapages containing invalid data are not copied to the new metablock. The old block is then erased and made available to store new data. The additional metapages of capacity gained by the consolidation can then be used to store other data.

During garbage collection, metapages of valid data with contiguous or near contiguous logical addresses are gathered from two or more metablocks and re-written into another metablock, usually one in the erased block pool. When all valid data metapages are copied from the original two or more metablocks, they may be erased for future use.

Data consolidation and garbage collection take time and can affect the performance of the memory system, particularly if data consolidation or garbage collection needs to take place before a command from the host can be executed. Such operations are normally scheduled by the memory system controller to take place in the background as much as possible but the need to perform these operations can cause the controller to have to give the host a busy status signal until such an operation is completed. An example of where execution of a host command can be delayed is where there are not enough pre-erased metablocks in the erased block pool to store all the data that the host wants to write into the memory, so data consolidation or garbage collection is needed first to clear one or more metablocks of valid data, which can then be erased. Attention has therefore been directed to managing control of the memory in order to minimize such disruptions. Many such techniques are described in the following United States patent applications, referenced hereinafter as the "LBA Patent Applications": Ser. No. 10/749,831, filed Dec. 30, 2003, entitled "Management of Non-Volatile Memory Systems Having Large Erase Blocks"; Ser. No. 10/750,155, filed Dec. 30, 2003, entitled "Non-Volatile Memory and Method with Block Management System"; Ser. No. 10/917,888, filed Aug. 13, 2004, entitled "Non-Volatile Memory and Method with Memory Planes Alignment"; Ser. No. 10/917,867, filed Aug. 13, 2004; Ser. No. 10/917,889, filed Aug. 13, 2004, entitled "Non-Volatile Memory and Method with Phased Program Failure Handling"; Ser. No. 10/917,725, filed Aug. 13, 2004, entitled "Non-Volatile Memory and Method with Control Data Management"; Ser. No. 11/192,220, filed Jul. 27, 2005, entitled "Non-Volatile Memory and Method with Multi-Stream Update Tracking"; Ser. No. 11/192,386, filed Jul. 27, 2005, entitled "Non-Volatile Memory and Method with Improved Indexing for Scratch Pad and Update Blocks"; and Ser. No. 11/191,686, filed Jul. 27, 2005, entitled "Non-Volatile Memory and Method with Multi-Stream Updating".

One challenge to efficiently controlling operation of memory arrays with very large erase blocks is to match and align the number of data sectors being stored during a given write operation with the capacity and boundaries of blocks of memory. One approach is to configure a metablock used to store new data from the host with less than a maximum number of blocks, as necessary to store a quantity of data less than an amount that fills an entire metablock. The use of adaptive metablocks is described in U.S. patent application Ser. No. 10/749,189, filed Dec. 30, 2003, entitled "Adaptive Metablocks." The fitting of boundaries between blocks of data and physical boundaries between metablocks is described in patent application Ser. No. 10/841,118, filed May 7, 2004, and Ser. No. 11/016,271, filed Dec. 16, 2004, entitled "Data Run Programming."

The memory controller may also use data from the FAT table, which is stored by the host in the non-volatile memory, to more efficiently operate the memory system. One such use is to learn when data has been identified by the host to be obsolete by deallocating their logical addresses. Knowing this allows the memory controller to schedule erasure of the blocks containing such invalid data before it would normally learn of it by the host writing new data to those logical addresses. This is described in U.S. patent application Ser. No. 10/897,049, filed Jul. 21, 2004, entitled "Method and Apparatus for Maintaining Data on Non-Volatile Memory Systems." Other techniques include monitoring host patterns of writing new data to the memory in order to deduce whether a given write operation is a single file, or, if multiple files, where the boundaries between the files lie. U.S. patent application Ser. No. 11/022,369, filed Dec. 23, 2004, entitled "FAT Analysis for Optimized Sequential Cluster Management," describes the use of techniques of this type.

Figure 8:
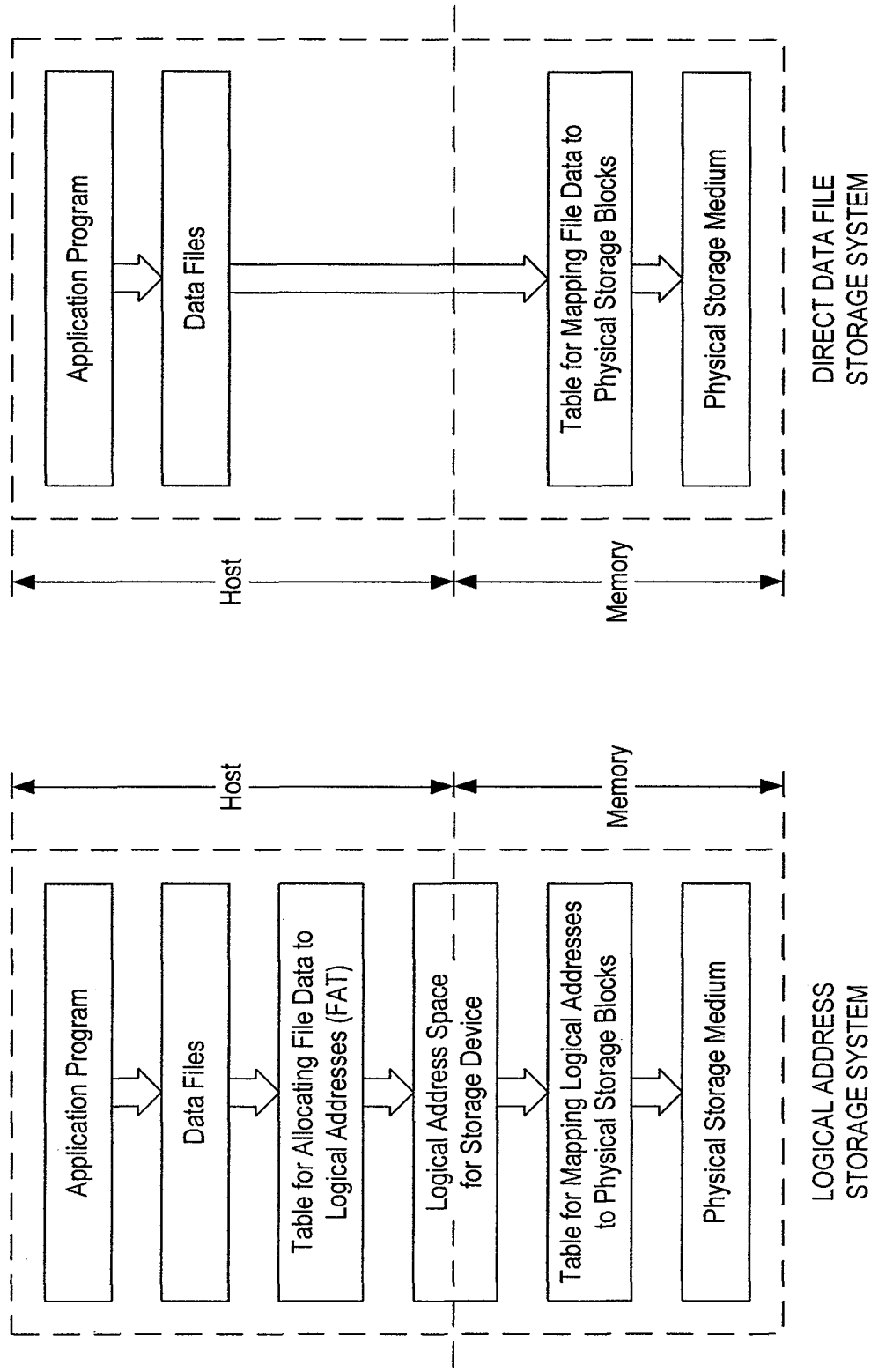
FIG. 8 illustrates in a different manner than FIG. 7 a logical address space interface between a host and a re-programmable memory system.

To operate the memory system efficiently, it is desirable for the controller to know as much about the logical addresses assigned by the host to data of its individual files as it can. Data files can then be stored by the controller within a single metablock or group of metablocks, rather than being scattered among a larger number of metablocks when file boundaries are not known. The result is that the number and complexity of data consolidation and garbage collection operations are reduced. The performance of the memory system improves as a result. But it is difficult for the memory controller to know much about the host data file structure when the host/memory interface includes the logical address space 161 (FIG. 7), as described above. Referring to FIG. 8, the typical logical address host/memory interface as already shown in FIG. 7 is illustrated differently. The host generated data files are allocated logical addresses by the host. The memory system then sees these logical addresses and maps them into physical addresses of blocks of memory cells where the data are actually stored.

A different type of interface between the host and memory system, termed a direct data file interface, also referred to as direct file storage (DFS), does not use the logical address space. The host instead logically addresses each file by a unique number, or other identifying reference, and offset addresses of units of data (such as bytes) within the file. This file address is given directly by the host to the memory system controller, which then keeps its own table of where the data of each host file are physically stored. This new interface can be implemented with the same memory system as described above with respect to FIGS. 2-6. The primary difference with what is described above is the manner in which that memory system communicates with a host system.

Figure 9:
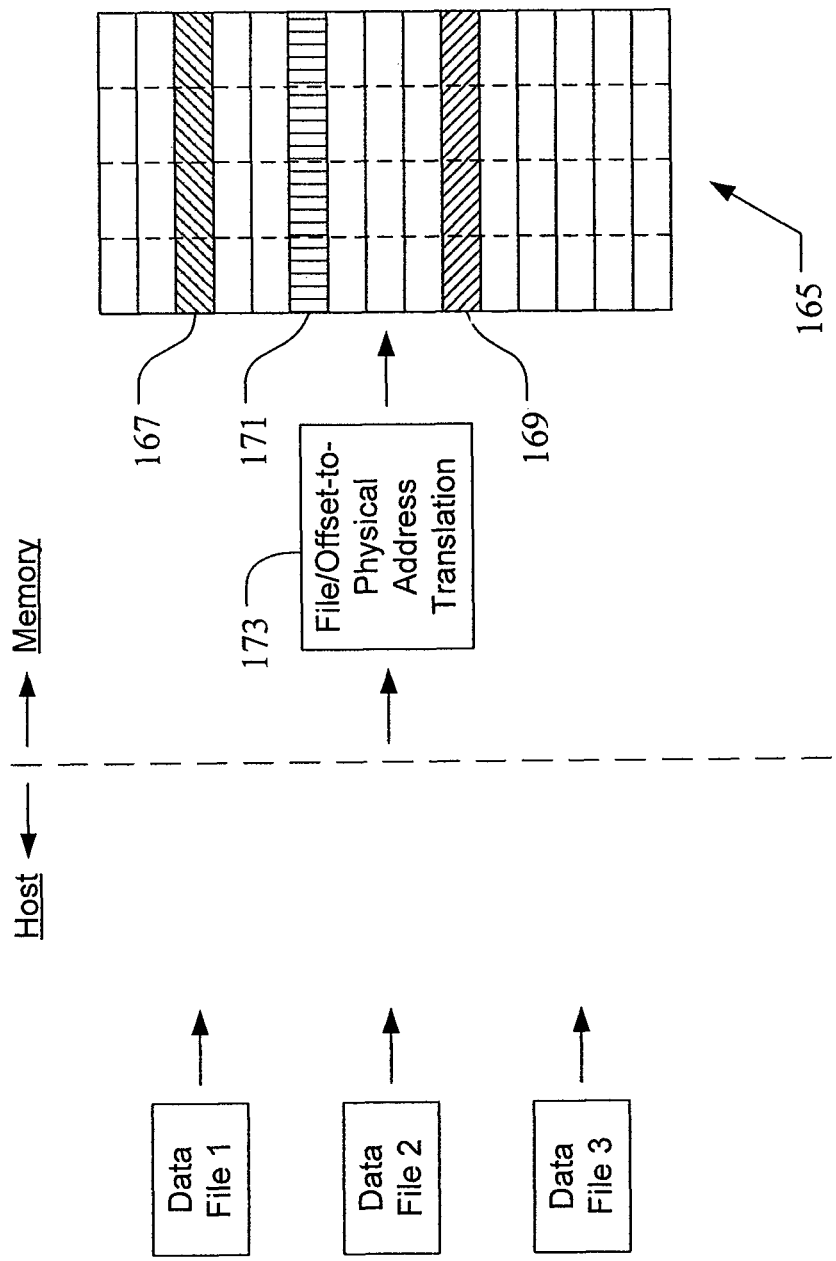
FIG. 9 illustrates a direct data file storage interface between a host and a re-programmable memory system.

A DFS file interface is illustrated in FIG. 9, which may be compared with the logical address interface of FIG. 7. An identification of each of the Files 1, 2 and 3 and offsets of data within the files of FIG. 9 are passed directly from the host to the memory controller. This logical file address information is then translated by a memory controller function 173 into physical addresses of metablocks and metapages of the memory 165. A file directory keeps track of the host file to which each stored sector or other unit of data belongs.

The direct data file interface is also illustrated by FIG. 10, which should be compared with the logical address interface of FIG. 8. The logical address space and host maintained FAT table of FIG. 8 are not present in FIG. 10. Rather, data files generated by the host are identified to the memory system by file number and offsets of data within the file. The memory system controller then directly maps the files to the physical blocks of the memory cell array and maintains directory and index table information of the memory blocks into which host files are stored. It is then unnecessary for the host to maintain the file allocation table (FAT) that is currently necessary for managing a logical address interface.

Because the memory system knows the locations of data making up each file, these data may be erased soon after a host deletes the file. This is not possible with a typical logical address interface. Further, by identifying host data by file objects instead of using logical addresses, the memory system controller can store the data in a manner that reduces the need for frequent data consolidation and collection. The frequency of data copy operations and the amount of data copied are thus significantly reduced, thereby increasing the data programming and reading performance of the memory system.

Direct data file storage memory systems are described in the Direct Data File Storage Applications identified above. The direct data file interface of these Direct Data File Storage Applications, as illustrated by FIGS. 9 and 10, is simpler than the logical address space interface described above, as illustrated by FIGS. 7 and 8, and allows for improved memory system performance. Although the direct data file storage may be preferred for many applications, host systems are primarily configured at the present time to operate with the logical address space interface. Thus, a memory system with a direct data file interface may not be compatible with most hosts. It is therefore desirable to provide a memory system configured to use a DFS memory management format with the ability to operate with a legacy LBA interface.

LBA to DFS Interface Adapter

Figure 11:
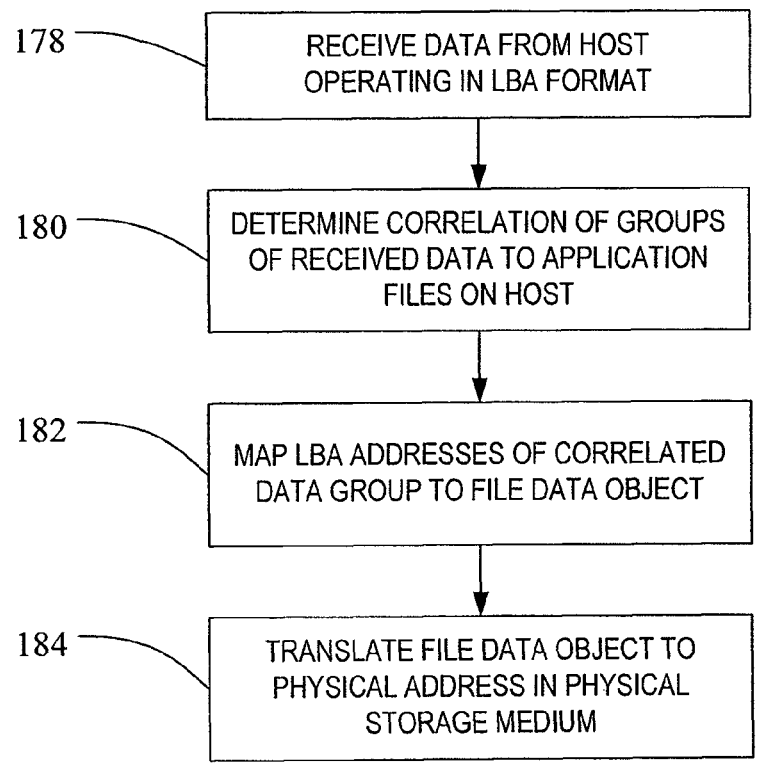
FIG. 11 is a flow diagram of a method for translating data from a host operating in a logical address space to a storage medium operating in a direct data file storage format.

To take advantage of the DFS memory management format in situations where the host operates in a logical address space, the memory system must translate the LBA format addresses in to DFS compatible file objects. Although not required, it is preferable that the translation from LBA to DFS include a determination of the correlation between the LBA address runs provided by the host and the application file those address runs correspond to on the host. As illustrated in FIG. 11, it is contemplated that the memory system receives data associated with addresses in a logical block address (LBA) format from the host system (at 178) and assembles a group of data within the received data from the host system based on a correlation of the group of data to an application file on the host system (at 180). The memory system would then map the LBA addresses for the group of data to offset addresses within a data object generated by the memory system (at 182). Using this data object, which is identified by a unique file name, the memory system would then directly translate the group of data identified by the unique file name into physical addresses of blocks of memory cells (at 184).

Figure 12:
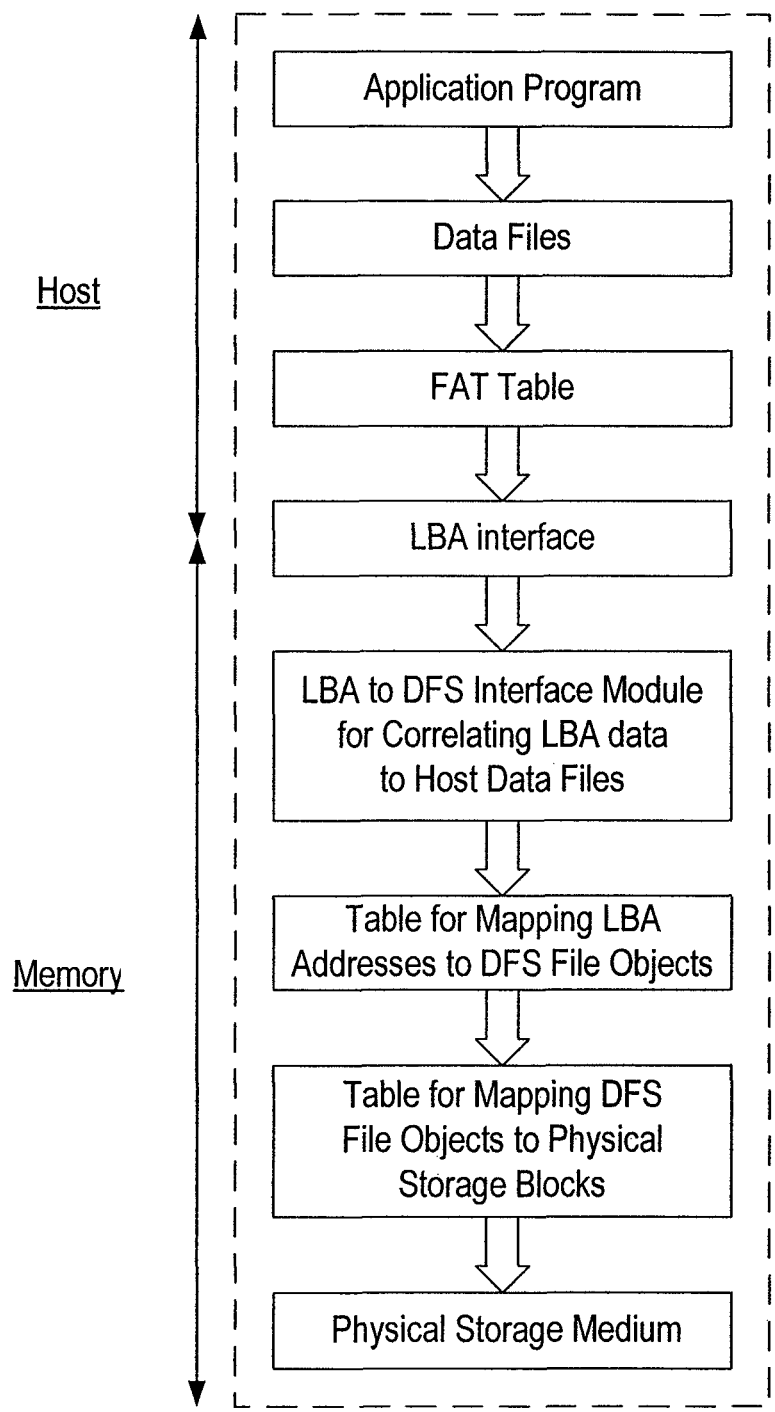
FIG. 12 illustrates a logical block address (LBA) to direct data file storage (DFS) interface adapter in a memory system in communication with a host.

Referring to FIG. 12, several of the differences between the LBA (FIG. 8), DFS (FIG. 10) and LBA-to-DFS storage systems can be see. Unlike the logical address space of the LBA storage format, the LBA-to-DFS storage format shown in FIG. 12 maps logical addresses supported by the host into data files manageable by the memory and then stores tables both for relating LBA addresses to file objects and for relating file objects to physical storage blocks. Unlike the host-controlled DFS storage format, the LBA-to-DFS storage format is compatible with hosts that use logical address space and maintain FAT table data.

Figure 13:
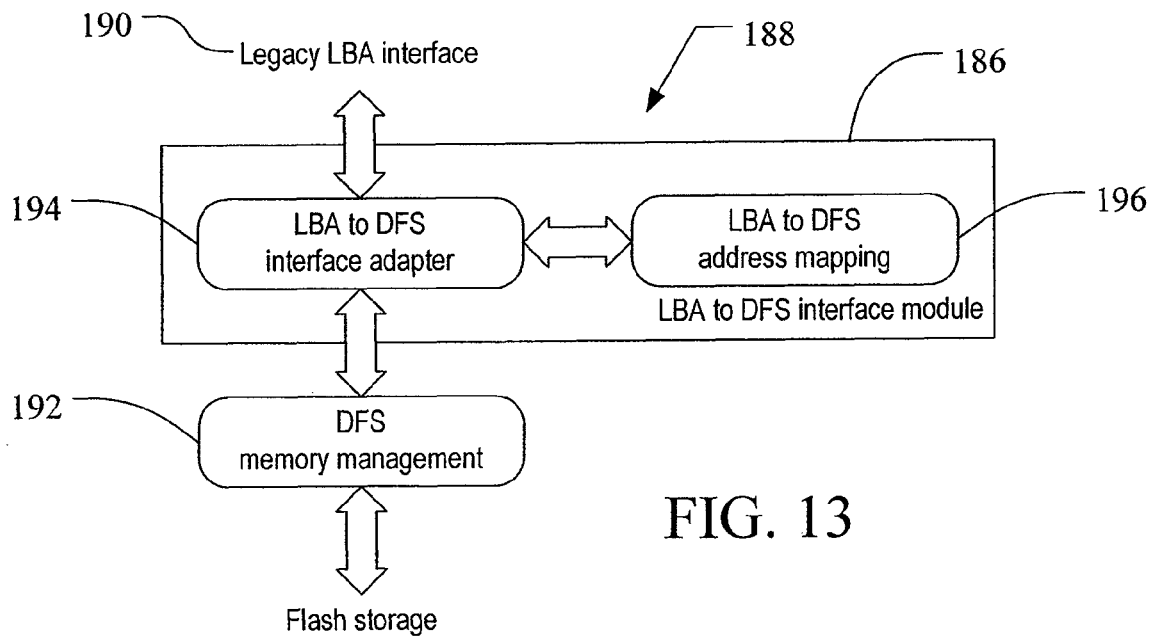
FIG. 13 is a block diagram of an LBA to DFS interface module suitable for carrying out the method illustrated in FIG. 11.

As shown in FIG. 13, in order to accomplish this interface between the logical address space of the host and the direct file storage format of the flash memory, an LBA to DFS interface module 186 in the memory system 188 is provided that permits for the translation between formats and for improved correlation between host-generated file data and the associated data in the memory. The LBA to DFS interface module 186 is positioned to communicate with a legacy LBA interface 190 and a DFS memory management module 192. The DFS memory management module 192 manages the translation of file objects to physical space in flash storage in the manner described for DFS above. The LBA to DFS interface module 186 may be implemented as processor executable firmware or software in the controller 11 of the memory system 2 of FIGS. 2-3.

When the interface module 186 receives data from a host via the legacy LBA interface 190, the data has been allocated LBA addresses within an address space for the memory system by a file system resident in the host and, as noted previously, the addresses for data received may be fragmented within the LBA address space. The function of the LBA to DFS interface adapter 194 is to create groups of data from within the data received at the LBA interface 190, each of which is treated as a unique file object by the DFS memory management module 192.

The LBA to DFS address mapping module 196 records the relationship between every LBA address in the device that has been allocated to store data for a file and its corresponding address in DFS format. Using this relationship information, it performs translation between LBA and DFS address formats. LBA to DFS address mapping guarantees that the correct data for any LBA address can be accessed, whatever the degree of correlation that may exist between a file object created by the LBA to DFS interface adapter 194 and an application file in the host.

An address run of contiguous LBA addresses that is allocated to valid data is mapped by the address mapping module 196 to a run of contiguous offset addresses for a DFS file object. An entry for each address run is stored in an LBA address table, and comprises the following fields:

1. Start LBA
2. Length of Run in Sectors
3. DFS fileID
4. Start DFS offset address A lookup operation for a target LBA is performed on the LBA address table as follows:

a) The entry with the lowest value in its "start LBA" field that is > or =target LBA is found b) The previous entry is selected as the entry defining the target LBA run c) The run offset of the target LBA within the target LBA run is identified as the target LBA minus the value in the "start LBA" field d) If run offset>the value in the "length of run in sectors", then the target LBA does not exist in the device and the lookup operation is complete e) The target DFS fileID is read as the value in the "DFS fileID" field f) The target DFS offset address is determined as the value in the "start DFS offset address" field plus run offset The DFS fileID is created by the DFS memory management module 192 in response to a request by interface adapter 194. The DFS fileID is recognized by the DFS back-end of the memory system 188. The DFS file ID and the offset address are used by the DFS memory management module 192 to map the file object to physical address locations, or memory blocks, in the flash memory. Entries in the LBA address table are stored in order of their start LBA value, and are not necessarily grouped together according to DFS fileID value.

The LBA address table does not relate the start offset address value for an address run relating to a specific DFS fileID to an offset in the corresponding application file in the host, either implicitly or explicitly. If the start LBA address value for data to be written to a DFS file with specified fileID already exists in the LBA address table and is already mapped to that fileID, the write operation is an update to existing data and the existing DFS offset address value is retained. If the start LBA address value for data to be written to a DFS file with specified fileID does not exist in the LBA address table, the write operation is an append operation and the highest existing DFS offset address for that fileID incremented by one is used. If the start LBA address value for data to be written to a DFS file with specified fileID already exists in the LBA address table but is already mapped to a different fileID, the request is either treated as an error, or the write operation is treated as an append operation, depending on the scheme being used in the LBA to DFS interface adapter 194.

When a file is deleted, all entries in the LBA address table relating to the DFS file with specified fileID are removed. The LBA address table is stored as a file by DFS memory management 192. Read and write operations to this file may be in DFS offset address units of a sector.

In order to map the LBA addresses to DFS addresses, the LBA to DFS interface adapter 194 must first create the file objects that are used to define the DFS addresses. Although the file objects created by the interface adapter 194 preferably correlate with application files that are managed within the host system, file objects uncorrelated with the application files may also be generated. One or more different file object generating schemes can be incorporated in the LBA to DFS interface adapter 194 for creation of file objects. The LBA to DFS interface adapter 194 may be configured with the capability of executing more than one of the schemes or selecting between one or more such schemes. For instance, if the interface adapter 194 is associated in a removable memory system that may be used with multiple hosts, the interface adapter 194 may be configured with two or more of the schemes and may automatically select a particular scheme based on the type or arrangement of the host it is connected to. The selection may be a permanent selection based on the first host that the memory system is connected with, or the selection may take place each time a different host is connected with the memory system. In yet other implementations, the interface adapter may select a scheme on a file-by-file basis rather than making a one-time scheme selection when the removable memory system is first connected with a particular host. Alternatively, the memory system may be configured with only one of these schemes. For example, if the memory system is fabricated for use with a single host, as is the case for a solid state disk for a laptop computer, then a single one of the schemes discussed below may be implemented.

As used in the discussion herein, the term "file" is defined as a grouping of application data that is managed as a named entity within the host file system. Data may be deleted in units of complete files. The term "metadata" is defined herein as any grouping of data created within the host file system. Examples of metadata may include data for a root directory, file allocation table (FAT) directory, FAT entries, or the equivalent in the NTFS file system. In the NTFS file system, files of metadata, also referred to as a "metafile", store groups of metadata. Metafiles may be separately defined for cases where there is set of data within which part of the data is regularly updated or for a set of data that may be independently deleted. A limited number of metafiles may exist.

Examples of the different file object generating schemes are reviewed below. Some of these schemes take advantage of information on host data files available prior to a data write operation. In one scheme, file objects are created based on file tagging information that is passed from the host at the LBA interface before related data is written. This information allows all data to be associated with a specific file or a specific file metadata. In a second scheme, file objects are generated based on the content of file metadata that is written by the host at the LBA interface 190 before related file data is written. This information allows all file data to be associated with a specific file.

File metadata directly relating to a specific file is often written after the data for that file has been written. In a third scheme, file objects are generated by the interface adapter 194 based on interpretation of LBA addresses and address sequences for data and on the content of file metadata previously written at the LBA interface 190. This file object generating scheme may provide a high correlation between a file object and data for a single file. In a fourth approach to generating file objects, the interface adapter 194 may be configured to generate file objects based on the sequence of data that is written between specific sequences of a write and/or read of file metadata, which are identified as file separators. In this approach, the content of file metadata is not used. This fourth approach may be capable of providing reasonable correlation between a file object and data for a single application file.

When insufficient data is available regarding host files before or after a write operation, or the memory system is unable to determine compatibility with a given host, a fifth approach may be used. This fifth approach to generating file objects may simply utilize specified ranges in the address space at the LBA interface 190 and assign each logical address range to a different file object. This method generally provides little correlation between a file object and data for a single file, but permits the use of the memory system with the host's logical address space format. Each of these five file object generation schemes is discussed in greater detail below. It should be noted that the various file object generation schemes may be implemented in the LBA to DFS interface module 186 as firmware or as processor executable software routines.

File Tagging

In the first scheme, the LBA to DFS interface adapter 194 creates file objects based on file tagging information that is passed from the host at the LBA interface before related data is written. Although the host maintains its memory space in an LBA format, it is modified to enhance compatibility with DFS memory devices by providing application file correlation information. This information allows all related data to be associated with a specific file or a specific metafile.

For the file tagging scheme to function, the host device is configured to generate a set of commands to convey the file association information and notification of when a file is deleted within the host's file system. These file tagging commands may be included as extensions to the interface protocol, and may be implemented as reserved codes in the legacy LBA interface command set. The commands may be transmitted from the host to the LBA to DFS interface module 186 via reserved or unallocated command codes in a standard communication interface. Examples of suitable interfaces include the ATA interface, for solid state disks, or ATA-related interfaces, for example those used in CF or SD memory cards. The host would only need to provide the commands during a write-related operation and it is contemplated that the file tagging commands would not be used when data is being read at the LBA interface.

The file tagging commands set forth below each include one or more parameters. One of the parameters is an identifier (ID). A file or a metafile is identified in a file tagging command by an ID that is assigned by the host when the file is created or opened. When the file is closed by the host, the ID is no longer associated with the file and is invalid unless it is re-used by the host when another file is opened. The ID values are all invalid when power is first applied to the memory system. Another parameter that may be passed in a file tagging command is the file type. This parameter may have a value that designates between files and metafiles, for example it may take the value "metafile". Also, an identifying address (IA) parameter may be used in a file tagging command. The IA is any LBA address at which data for the file is currently stored. The IA may be the LBA address of the start of the file and is used to identify an existing file when the file is opened and an identifier is assigned by the host.

The host device, although handling data in a LBA format, includes a file tagging command set that may be an abbreviated version of the set of commands used internally by the DFS format memory system. The host can then assist the memory system in providing information to create highly correlated data objects while not knowing or needing to know how the data is stored in the memory system, other than by LBA address. The LBA to DFS interface adapter 194 will translate the LBA address information and the file tagging information to permit each of the host and the DFS memory manager 192 in the memory system to operate in their native formats. The file tagging commands issued by a host may include the following:

$identify: This file tagging command is a query sent to a memory system during initialization of the memory system to alert the memory system that the host is capable of providing file tagging information. The LBA to DFS interface module 186 may exchange handshake information to verify the desire for the host to provide file tagging information.

$create <ID> <type>: This file tagging command provides notification that a new file has been created and should be opened, and has been assigned identifier value <ID>. The <type> parameter is optional and, as noted above, may take a value such as "metafile". The $create command should be passed before any other command relating to the file that has been created by the host.

$open <ID> <IA>: This file tagging command provides notification to the interface adapter 194 that a closed file with identifying address <IA> has been opened by the host and has been assigned identifier value <ID>. The $open command should be passed before any other command relating to the file that has been opened by the host.

$file <ID>: This file tagging command provides notification that the following data relates to the open file with identifier value <ID>. The $file command should be passed before any write command for data for which the file has changed from that for the previous data.

$close <ID>: This file tagging command provides notification that the open file with identifier value <ID> has been closed by the host. The $close command should be passed before any command to open another file.

$delete <ID>: This file tagging command provides notification that the open file with identifier value <ID> has been deleted by the host. The $delete command should be passed before any cluster addresses previously allocated to the file are re-allocated.

$free <start> <length>: This file tagging command provides notification that the run of sequential clusters with starting LBA and length in clusters defined by <start> and <length>, which was previously allocated to a file that has not been deleted, has been designated free. The $free command should be passed before any of the designated cluster addresses is re-allocated.

As part of the exchange of information between the host 1 and the LBA to DFS interface adapter 194 of the memory system 2, a table mapping the ID used by the host to the DFS file ID used by the memory system is created and maintained for every open file in the memory system. Each entry in the ID table contains the ID value and fileID of the file. An entry is added to the table for each $create or $open command, and an entry is deleted from the table for each $close or $delete command. Although the ID table may be stored in non-volatile or volatile memory, in one implementation the ID table is stored in volatile memory, such as RAM 31 in controller 11 of FIG. 2, as all ID values are meant to be invalid if power is removed from the memory device. The DFS fileID value is used for all subsequent $DFS_write commands passed by the interface adapter 194 to DFS memory management 192, until re-specified by another file tagging command. In other implementations, if the host is configured to maintain ID information such that an application file will always receive the same ID regardless whether that application file is currently open or power is cycled, the ID table may be maintained in non-volatile memory in the memory system 2.

Each of the file tagging commands causes the LBA to DFS interface module to take one or more steps to assist the memory manager in maintaining the efficient file object storage format of DFS. For example, in advance of writing to on an open file, the host will send a $file command. In response, the interface module 186 reads the ID table to determine the DFS fileID to which the ID value received with the $file command relates. This fileID value is used for all subsequent $DFS_write commands passed to DFS memory management 192, until re-specified by another file tagging command.

Figure 14:
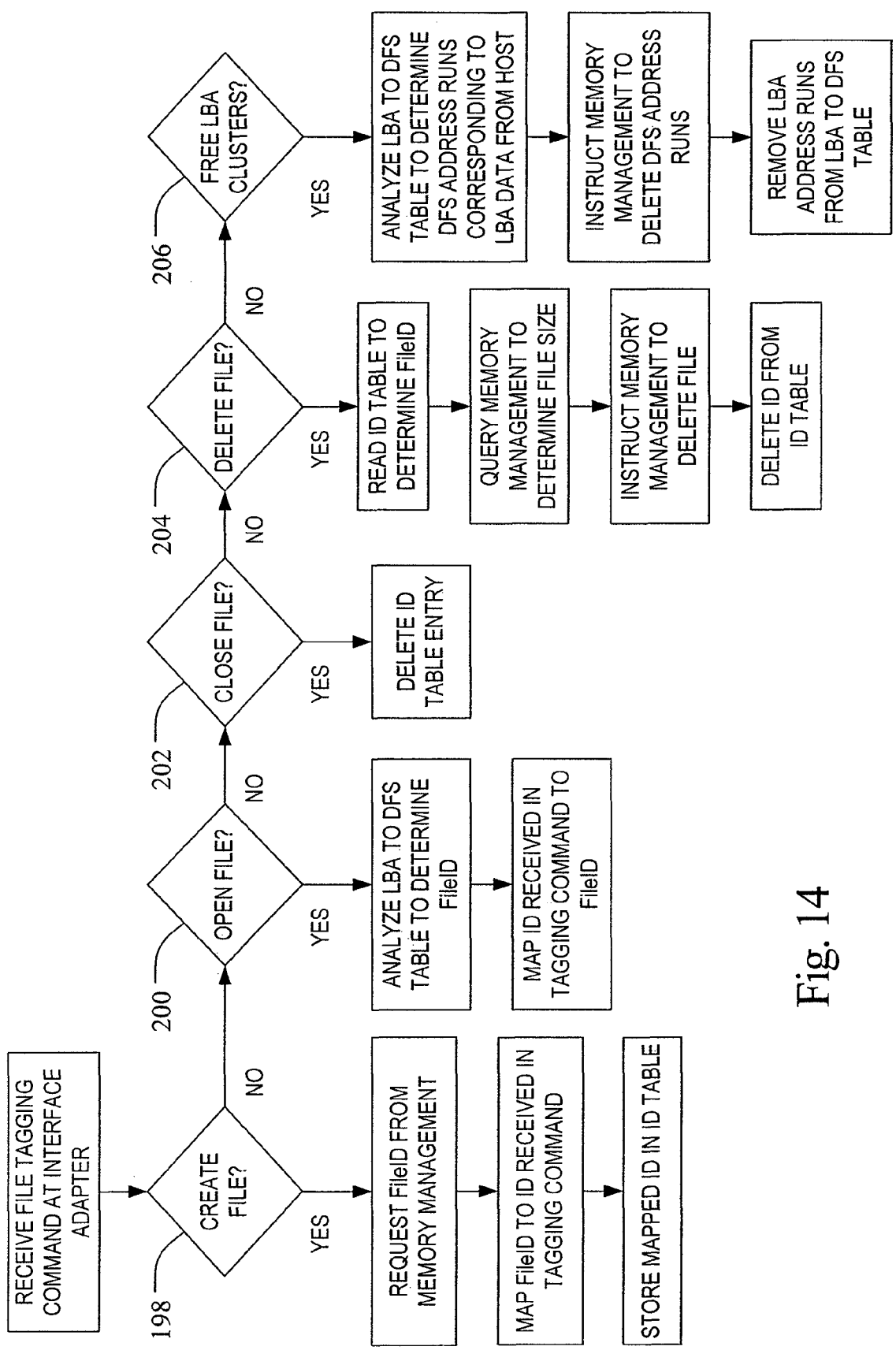
FIG. 14 is a flow diagram of LBA to DFS interface module activity in response to host file tagging commands.

Other examples of operations performed by the LBA to DFS interface module, using the file tagging scheme outlined above, are illustrated in FIG. 14. Upon receipt from the host of a $create command identifying that the host is opening a new file (at 198), the interface adapter 194 generates a separate $DFS_create command and passes this command to DFS memory management 192. DFS memory management 192 responds with a DFS fileID value. An entry is added by the interface adapter 194 to an ID table, recording ID and fileID values.

Upon receipt of a $open command from a host (at 200), the LBA address table is read to determine the DFS fileID to which data at LBA address IA has been mapped. An entry is added to the ID table, recording ID and fileID values, and a $DFS_open command for the relevant fileID is passed by the interface adapter 194 to DFS memory management 192. This fileID value is used for all subsequent $DFS_write commands passed to DFS memory management 192, until re-specified by another file tagging command.

The steps taken by the interface adapter 194 in response to receipt of a $close command are also shown in FIG. 14 (at 202). The ID table is read to determine the DFS fileID to which the ID value received with the $close command relates. A $DFS_close command for the relevant fileID is passed to DFS memory management 192. The entry for the ID value is removed from the ID table.

Following a $delete command (at 204), the ID table is read to determine the DFS fileID to which the ID value received with the $delete command relates. A $DFS_file command is passed from the interface adapter 194 to DFS memory management 192 to determine the size of the file that has been deleted. A $DFS_delete command for the relevant fileID is then passed by the interface adapter 194 to DFS memory management 192. The interface adapter 194 removes the entry for the ID value from the ID table. Additionally, entries for LBA runs previously allocated to the deleted file are removed from the LBA address table.

In response to a $free command from the host (at 206), as shown in FIG. 14, the LBA address table is read to identify DFS address runs mapped to LBA address runs that have been de-allocated by the $free command. A $DFS_delete_data command is passed from the interface adapter 194 to DFS memory management 192 for each DFS run thus identified. Also, entries are modified or removed from the LBA address table for each LBA run identified.

The file tagging approach described above relies on a host having the ability to provide file tagging commands along with the LBA for data. Other approaches, described below, are available for use by a memory system when a host is not configured with file tagging commands. Most of these other approaches may provide a reasonable correlation between the received data and the application file to which the received data corresponds.

File System Data Analysis

A second approach to correlating host application files to ranges of LBA data received at a memory system is through file system data analysis. In this approach, the LBA to DFS interface adapter 194 creates file objects based on the content of file system data that is written by the host at the LBA interface before related file data is written. This information allows file data to be associated with a specific file where the LBA to DFS interface adapter 194 can generate a file object for a new file or determine which previously generated file object is being written to, read, modified or deleted. This approach is suitable for operating systems that write file system data prior to writing the related file data.

One such operating system, when used with a removable storage card formatted for operation with a FAT file system, is WINDOWS XP. Although the specific example of WINDOWS XP is provided herein, the approach may be applied to other operating systems that write file system data prior to writing the related data. In the case of WINDOWS XP, it has been observed that the operating system uses the following sequence of operations, detectable at the memory system interface, to write an application file:

1. A sector containing the volume boot record (VBR) is written, and a reserved byte is set to the value 1. This provides a subsequent indication that a file write operation is in progress.
2. Sectors containing directory entries for the directory relating to the file are written. An entry containing the filename, the starting cluster of the file, and the file length is written in this operation.
3. A sector or sectors are written to FAT1, to set the "volume dirty bit" to 1 in the entry for cluster 1 and to write the FAT information for the file. The volume dirty bit indicates that the file system may be in an inconsistent state.
4. A sector or sectors are written to FAT2, to write the same information as in step 3.
5. The directory sectors written in step 2 are re-written, and the entry for the file is updated to set the "date of last file write".
6. The file data is written.
7. The directory sectors written in step 5 are re-written, with the same information.
8. The volume boot record (VBR) sector written in step 1 is re-written, and the reserved byte is reset to the value 0.
9. The sector or sectors written to FAT1 in step 3 are re-written, to set the "volume dirty bit" to 0 in the entry for cluster 1.
10. The sector or sectors written to FAT2 in step 4 are re-written, to write the same information as in step 9.

Figure 15:
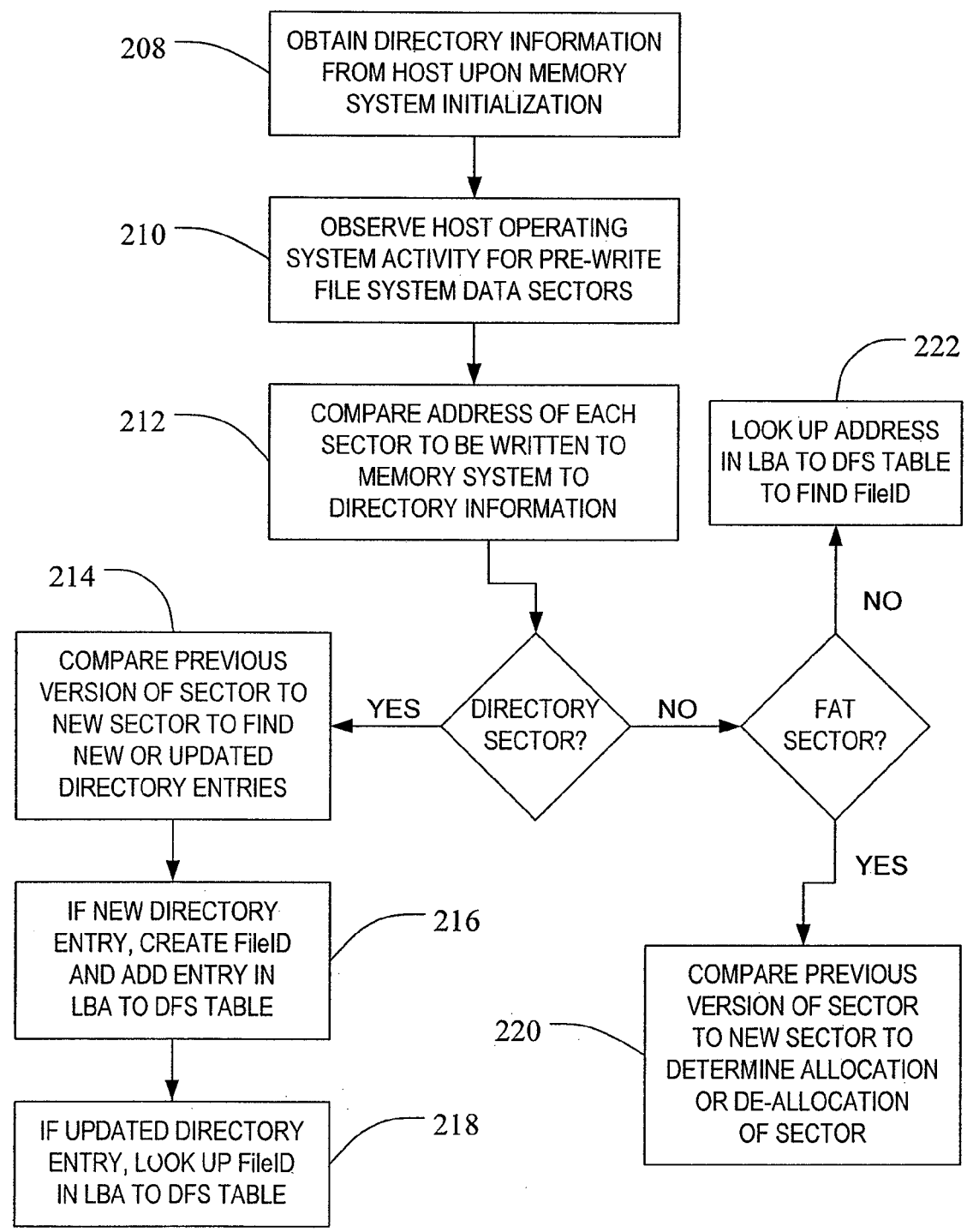
FIG. 15 is a flow diagram of LBA to DFS interface module activity when correlating LBA data to host application files by interpreting host file system data.

Referring to FIG. 15, to analyze this file system data the LBA to DFS interface module 186 maintains a record of runs of LBA addresses that are allocated to the root directory and subdirectories in the memory system. This information is obtained from the host during initialization of the memory system by scanning the directory tree for directory entries, and is stored in a DFS file in the memory system (at 208). It may also be partially or fully cached in RAM. Similarly, the LBA address locations at which the FAT1 and FAT2 file system structures are stored are known.

After this initialization, whenever an address for a sector of data to be written is received (at 210), the LBA to DFS interface adapter 194 checks the address against this list of directory sector addresses (at 212). When a sector to be written is identified as a directory sector (as in steps 2, 5 and 7 above), the previous version of the sector is first read from flash memory and its data is compared with the new incoming data to find any directory entries that are being created or updated (at 214). When analysis of the directory sector determines that the directory address is for a new directory entry, which may be detected if the comparison reveals that a new directory has been inserted within or at the end of the sector, a new file has been created by the host file system. The LBA to DFS interface adapter 194 passes a $DFS_create command to DFS memory management 192, which responds with a DFS fileID value. The LBA to DFS adapter also adds an entry to the LBA address table, relating the LBA address for the first cluster of the file, as defined in the new directory entry, to the DFS fileID for the file (at 216).

Alternatively, when analysis of the directory sector detects that a directory entry incorporates a modified cluster address for the start of the file's FAT chain, the LBA to DFS interface adapter 194 recognizes that an existing file is being updated. The start cluster address in both the previous and the updated versions of the directory entry are recorded. The DFS fileID for the file is determined by reading the entry in the LBA address table relating to the start cluster address in the previous version of the directory entry (at 218).

When it is detected that one or more FAT entries have changed to indicate allocation of a cluster to a file, subsequent data written to this cluster address will be part of this file. The identity of the file may be found by scanning the associated FAT chain in a forward direction for each directory entry in the previously detected directory sector, until the allocated cluster address is found. The first cluster address in the relevant FAT chain may be used to access the ID table to determine the DFS fileID for subsequent data.

Whenever an address for a sector of data to be written is received, and it is not a directory sector, it is checked against address locations for FAT structures. When a sector to be written is identified as a FAT sector (as in steps 3, 4, 9 and 10 above), the previous version of the sector is first read from flash memory and its data is compared with the new incoming data to find any FAT entries that have changed to indicate either allocation or de-allocation of a cluster to a file (at 220).

If an address for a sector of data to be written is determined not to relate to file system data, the DFS fileID to which the data relates is found by performing a lookup in the LBA address table (at 222) to find the DFS fileID and DFS offset address that are mapped to the LBA of the sector. The LBA to DFS interface then knows to use this fileID value for subsequent $DFS_write commands passed to DFS memory management 192.

Address & File System Data Interpretation

File metadata directly relating to a specific file is often not written until after the data for that file has been written. Thus, the first two approaches discussed above, which generally use information or metadata provided before file data is written, may not be appropriate if the host does not provide file tagging information or is running an operating system that is unfamiliar or does not provide pre-write data. A third approach the LBA to DFS adapter may utilize in creating file objects is the interpretation of LBA addresses and address sequences for data, and on the content of file metadata previously written at the LBA interface. This method of interpretation may provide a high correlation between a file object and data for a single file.

Data received from the host is written immediately in DFS files, without buffering in any temporary location in flash memory. Since the FAT file system frequently stores directory and FAT information to fully describe a file only after data for the file has been written, the LBA to DFS interface adapter 194 may need to include the ability to identify when there is a change in the file being written without having access to complete file system data. In the situation where the host uses the FAT file system, the LBA to DFS interface adapter 194 may implement this third approach by monitoring the sequence of LBA addresses for file data written by the file system, the content of data written to LBA addresses corresponding to directory and FAT locations, and the LBA to DFS address mapping table that it maintains for every LBA address run corresponding to valid data in the memory system. With this information, the LBA to DFS interface adapter 194 can identify when transitions have occurred in the identity of the file with which data currently being written is associated and thereby achieve good correlation between host application files and DFS files.

For each transition in LBA address in the stream of LBA data, it can be determined if a file transition may have occurred, as shown in table 1 below. However, it is unlikely to unambiguously resolve all file associations using this method alone. This is due, in part, to the possibility of interleaved bursts of different file information being written.

TABLE 1

| LBA transition | | | | | | | File transition | | |
|---|---|---|---|---|---|---|---|---|---|
| Sector | | | Cluster | | | | | | |
| | Jump to | Jump to | | | | Cluster | | | |
| Sequential LBA | first LBA of cluster | LBA within cluster | Same cluster | Sequential cluster | Jump to cluster | contains data | Same file | New file | Different file |
| yes | | | yes | | | | Always | | |
| yes | | | | yes | | no | Possible | Possible | Possible |
| yes | | | | yes | | yes | Possible | | Possible |
| yes | | | | | Not possible | | | | |
| | yes | | yes | | | | Always | | |
| | yes | | | yes | | no | Possible | Possible | Possible |
| | yes | | | yes | | yes | Possible | | Possible |
| | yes | | | | yes | no | Possible | Possible | Possible |
| | yes | | | | yes | yes | Possible | | Possible |
| | | yes | yes | | | | Always | | |
| | | yes | | yes | | no | Possible | Possible | Possible |
| | | yes | | yes | | yes | Possible | | Possible |
| | | yes | | | yes | no | Possible | Possible | Possible |
| | | yes | | | yes | yes | Possible | | Possible |

To assist with the accuracy of correlating the data to a particular file, the interface adapter 194 may also determine transitions between files that occur in a stream of LBA data by analyzing the content of data in preceding write operations to LBA addresses corresponding to directory and FAT locations. It may also be determined if data for a file is new data, or is being updated. This is done by identifying the following conditions in the directory and FAT data, and relating relevant combinations of presence and absence of the conditions to probable or possible transitions in the file to which data is being written.

Directory Writes

1. A directory write immediately preceded the current LBA transition

2. An entry for a new file was added in a directory write identified in (1)

3. A chain of FAT entries was added for a new directory identified in (2)

FAT Writes

1. A FAT write immediately preceded the current LBA transition

2. An EOF entry was added in a FAT write identified in (1)

The probable file transitions that occur within a stream of data identified by LBA addressing are identified by combining the results of the data stream and directory write analyses described above. Where a type of file transition cannot be determined with certainty based on this information, statistics of the relative probabilities of a transition to each of the possible types of file are used to determine the bounds of a file object. If a transition has occurred to a different existing file whose identity cannot be determined, then a new file should be created instead.

Additionally, the LBA to DFS interface adapter 194 can use this third approach to identify if the boundaries of a file object previously written to memory need to be modified after receipt of fully definitive directory and FAT information for a host file. For example, because subsequent FAT and directory information written by the host is definitive of the file boundaries, the LBA to DFS interface adapter 194 can compare this definitive information to the DFS fileID generated by the initial interpretation of LBA to DFS correlation. The interface adapter 194, upon receiving the FAT and directory information after a write operation will compare the LBA addresses maintained in its LBA to DFS Table for a particular DFS fileID to the LBA addresses to see if there are any discrepancies. If the interpretation of correlation resulted in the LBA to DFS table having LBA addresses listed with more than one DFS fileID when the FAT or directory data reveals that they should be part of the same host application file, and therefore the same DFS fileID, then the interface adapter 194 can rearrange the LBA to DFS table to move the LBA addresses to a single DFS fileID. The interface adapter would also communicate with the memory management module 192 to rearrange the physical arrangement of the memory blocks to conform to the correct file and offset information. Conversely, if the comparison of LBA to DFS table information to the FAT and/or directory information reveals that LBA addresses listed in one file should actually be split among different DFS fileIDs, then the interface module 194 may split up the LBA addresses among the correct DFS fileIDs in the LBA to DFS table and instruct the memory management of the correction.

Figure 16:
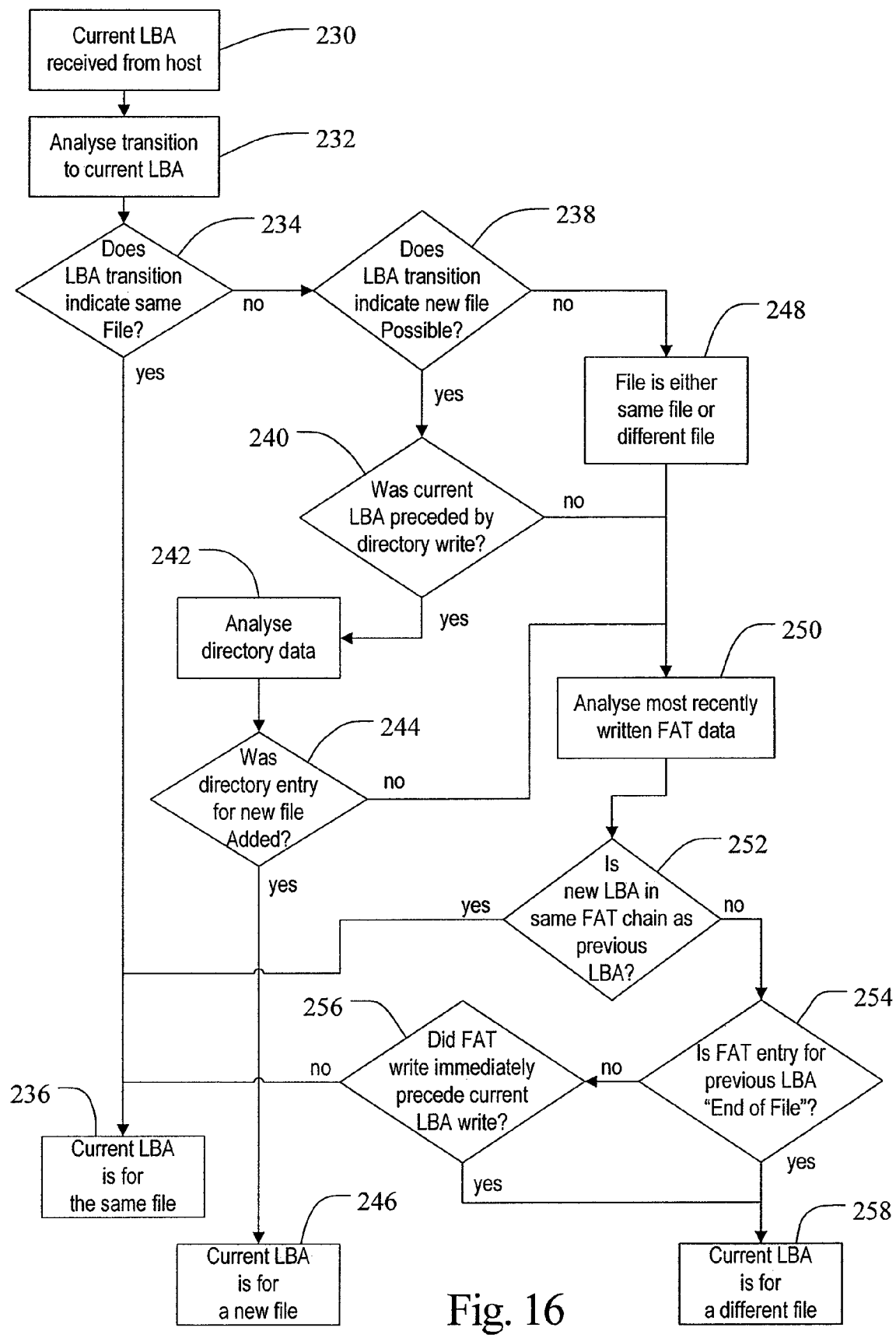
FIG. 16 is flow diagram of LBA to DFS interface module activity when correlating LBA data to host application files by interpreting address and file system data received from a host.

Referring to FIG. 16, a method of implementing the address and file system data interpretation to determine correlation of incoming data to host files is illustrated. The current LBA address is received from the host and then the transition to the current LBA address is analyzed (at 230, 232). Using the address transition options set forth in Table 1, if the LBA address transition indicates that the files are the same (at 234) then the LBA to DFS interface adapter 194 determines that the current LBA address is for the same file (at 236). If the LBA address transition indicates that the data is possibly for a new file (at 238), the LBA to DFS interface adapter 194 looks at whether a directory write preceded the current LBA address (at 240). If the current LBA address was preceded by a directory write operation from the host, then the LBA to DFS interface adapter 194 analyzes the directory data (at 242). If the directory entry indicates that a new file has been added then the LBA to DFS interface adapter 194 determines that the current LBA address is for a new file (at 244, 246).

Alternatively, if the directory entry was not for a new file, if the LBA address transition does not indicate a new file is possible or if the LBA address was not preceded by a directory write operation, then the file is either the same or a different existing file and the most recently written FAT data is analyzed (at 248, 250). If the new LBA address is in the same FAT chain as the previous LBA address, the LBA to DFS interface adapter 194 determines that the current LBA address is for the same file as the prior LBA address (at 236). If the new LBA address is not in the same FAT chain as the previous LBA, the LBA to DFS interface adapter 194 looks at whether the FAT entry for the previous LBA address was a "end of file" entry (at 252, 254). When the FAT entry was an end of file designator, then the LBA to DFS interface adapter 194 makes the determination that the current LBA address is for a different file than the prior LBA address (at 258). If the prior entry was not an end of file entry and a FAT write immediately preceded the current LBA address write, then the LBA to DFS interface adapter 194 determines that the current LBA address is for the same file as the prior LBA address (at 256, 236). If, however, the FAT entry was not an end of file designator and the FAT write did precede the current LBA address write, then the LBA to DFS interface adapter assumes that the current LBA address is for a different file than the prior LBA address.

File Separators

In this approach to correlating file objects to application files, a file object is created by the LBA to interface adapter 194 as the sequence of data that is written between specific sequences of write and/or read of file metadata, which are identified as file separators. The content of file metadata is not used. This method may provide reasonable correlation between a file object and data for a single file. At memory system initialization, the memory system interrogates itself to determine its root directory location and identify any subdirectories. Once the memory system is aware of the location of the directories, it determines if a directory write, and therefore potentially the end of a file, and therefore a file separator has been reached. Alternatively, a file separator may be identified by a more complex sequence of metadata, such as a write operation to both a directory sector and a FAT sector.

LBA Ranges

In this scheme, the LBA to DFS interface adapter 194 creates file objects based on specified ranges in the address space at the LBA interface. This method gives no correlation between a file object and data for a single file. An example of mechanically grouping a fixed LBA range into a file object usable by a DFS memory management module 192 is discussed in U.S. patent application Ser. No. 11/196,869, filed Aug. 3, 2005 entitled "Interfacing Systems Operating Through Logical Address Space And On a Direct Data File Basis."

DFS Commands Used by LBA to DFS Interface Module

Regardless of the specific approach used by the interface module 186 for generating a file object, once the interface module determines a DFS fileID relevant to a read or write operation, or recognizes the need to create a fileID, the interface module communicates with the DFS memory management module 192 using a subset of the DFS commands. These commands are generated within the LBA to DFS interface module 186 and passed to DFS memory management 192. The following DFS file commands are used by the interface module 186 to create a file object or instruct the DFS memory management 192 regarding activity relating to an existing file object.

$DFS_create<type>: The $DFS_create command causes a new file to be created in DFS memory management 192. An available fileID value is assigned to the file by DFS memory management 192, and is returned to the LBA to DFS interface module for use in subsequently identifying the file. A directory entry for the file is also created within DFS memory management 192, and the file is opened.

The <type> parameter is optional. If omitted, the file is treated as a standard DFS file. If <type> specifies a metafile received from the host, or a file storing management information for the LBA to DFS interface module, the DFS memory management 192 adopts the appropriate management strategy for this type of file. Special management strategies for a specific file can include avoiding sharing flash memory blocks with data for any other file, and using a specific type of flash block, such as binary (SLC) or MLC, for data for the file.

$DFS_open<fileID>: This $DFS_open command enables execution of subsequent data commands for the file specified by <fileID>. The write_pointer for the file is set to the end of the file, and the read_pointer for the file is set to the beginning of the file. If the specified value for <fileID> does not exist, or a specified maximum number of files that can be concurrently open is exceeded, the command is not executed and an error message is returned.

$DFS_close<fileID>: The $DFS_close command disables execution of subsequent data commands for the specified file. Write_Pointer and read_pointer values for the file become invalid.

$DFS_delete<fileID>: The $DFS_delete command indicates that directory, file index table and attributes entries for the file specified by <fileID> should be deleted. Data for the files may be erased. The deleted file may not be subsequently accessed.

In addition to the file commands, the interface module 186 may use a number of DFS data commands to initiate data input and output operations for a specified file, and to define offset address values within the file. The specified file must have been opened by the host. If this is not the case, an error is returned. As discussed in the file commands above, <fileID> is the file handle that was assigned by DFS memory management module 192 when the file was created. The DFS data commands are as follows:

$DFS_write<fileID> <length>: Data to be supplied to the device following receipt of the $DFS_write command will be written in the specified file at the offset address defined by the current value of the write_Pointer. The $DFS_write command is used to write new data for a file, append data to a file, and update data within a file. <length> is an optional parameter defining the length of data to be written. A $DFS_write command not specifying length may be superseded, after some associated data has been written, by another $DFS_write command for the same fileID specifying the length of data remaining to be written. DFS memory management 192 issues one or more instructions for writing a data burst in response to a $DFS_write command.

$DFS_read<fileID>: Data in the specified file at the offset address defined by the current value of the read_pointer may be read from the device following receipt of the $DFS_read command. DFS memory management 192 issues one or more instructions for reading a data burst in response to a $DFS_read command.

$DFS_delete_data <fileID> <offset> <length>: Indicates that data of specified length for the specified file and offset address should be deleted. The data may be erased.

$DFS_write_pointer<fileID> <offset>: The $DFS_write_pointer command sets the write_pointer for the specified file to the specified offset address. The write_pointer is incremented by the device following a data burst instruction in response to a $DFS_write command.

$DFS_read_pointer<fileID> <offset>: The $DFS_read_pointer command sets the read_pointer for the specified file to the specified offset address. The read_pointer is incremented by the device following a data burst instruction in response to a $DFS_read command.

The LBA to DFS interface module 186 may also issue a DFS state command: The $DFS_idle command indicates that the LBA to DFS interface module is entering an idle state, during which DFS memory management 192 may perform internal operations. The idle state may be ended by transmission of any other command to DFS memory management 192, whether or not it is busy with an internal operation. Upon receipt of such other command, any internal operation in progress in the DFS memory management 192 must be suspended or terminated within a specified time.

The following DFS device commands allow the LBA to DFS interface module to interrogate the DFS memory management module 192:

$DFS_capacity: In response to the $DFS_capacity command, DFS memory management 192 reports the capacity of file data stored in the device, and the capacity available for new file data.

$DFS_file: In response to the $DFS_file command, DFS memory management 192 reports information about the specified file, including size.

$DFS_status: In response to the $DFS_status command, DFS memory management 192 reports its current status. The status command does not terminate a command being executed. Status includes two types of busy status. DFS memory management 192 is busy performing a foreground operation for writing or reading data. DFS memory management 192 is busy performing a background operation initiated whilst the LBA to DFS interface module was in the idle state.

A memory system 2 may be configured with one or more file correlation detection schemes such as discussed above depending on the intended application. A removable memory system, such as a CF card, may be used in any of a number of different host devices and may benefit by the flexibility of having an LBA to DFS interface adapter configured with multiple file object generating methods. The method of interpreting file tagging to accurately LBA format data to host application files would be a preferred technique for generating file objects; however the host needs to already possess the ability to provide these commands. To alleviate compatibility issues, in one implementation the memory system may include a LBA to DFS interface module 194 as described above that is configured with multiple methods for generating file objects. Upon memory system initialization, the memory system may determine which of these file object generating methods is best suited for the host it is connected to. For example, the interface module 186 may be preconfigured to cycle through the methods for file object generation in a predetermined order, from the highest correlation method to lowest.

The selection of which file object generation scheme to use may be made one time in the life of the memory system upon first initialization, each time the memory system is powered up, each time the memory system is connected with a new host, or on a file-by-file basis. The selection of the file object generation scheme may be based on information received or determined from the host. This information may include, among other information, receipt of a handshake or file tagging command recognized by the memory system, recognition of the type of operating system used by the host or a lack of the above information. Alternatively, the memory system could be manufactured with the ability to execute a single file interface generation scheme in the interface module 186. In situations where the memory system will be assembled for use in a known type of host, for example a solid state disk designed for use in a specific host device, or if removable memory systems are labelled for use with certain types of host devices, then the LBA to DFS interface module may logically only need the ability to use one method.

In yet other implementations, it is contemplated that a memory system 2 configured with a LBA to DFS interface adapter 194 may also include a set of instructions to pass to a host to enable the host to provide file tagging instructions such as described above. In this implementation, the memory system 2 may initially attempt to upload the instruction set for generating file tagging commands to the host. This upload may be triggered upon memory device initialization, for example when the memory system 2 receives power, and may include processor executable instructions for generating file tagging commands to send to the memory system 2. The upload of the instructions to the host may be automatic on power-up, may follow an unanswered handshaking query such as the $identify command discussed above, or may be triggered by other combinations of operations.

Although higher correlation of file objects to the host application files is preferable in order to optimize the benefits of improved memory system performance from a DFS memory management system, correlation does not affect memory system functionality. An absolute mapping between LBA address runs and offset addresses within DFS files is rigorously maintained in the LBA to DFS address mapping module 196 regardless of the approach used to create file objects. However, the closer the correlation that can be achieved, the greater is the efficiency of the data storage management by DFS. When fully definitive directory and FAT information for a host file has been written, a comparison can be made between the allocation of LBA addresses to that host file and the allocation of the same addresses to the file object in which the data has been stored. The interface module 186 may include the ability to request of the memory management 192 that files be split or merged, based on their correlation with host files. The DFS back-end will only accept a request if the operation can be performed substantially without relocating file data, by modifying the file index table records in DFS.

Separate file objects, represented by respective DFS fileIDs, may be associated with each other by means of a $DFS_associate command generated by the LBA to DFS interface adapter 194. Files for which an association has been formed are referred to as an associated set. A purpose of file association is to restrict the number of blocks containing data for files in the associated set together with data for files not in the associated set. When the interface adapter 194 uses the $DFS_associate command, the associated file objects should be deleted as a set when the external host file is deleted. Block fragmentation for the associated set may be controlled using a scheme similar to that used for a single DFS file as described in the Direct Data File Storage Applications using of a variant of the allocation algorithm for the block to which data for a file is to be written (the active block for the file).

An associated set of files may created by a single $DFS_associate command. All DFS fileIDs in the associated set should be specified as parameters for the command. If any file in the set was previously associated with one or more other files not currently specified in the set, the association status of these other files is cancelled. All files specified by a $DFS_associate command to be in an associated set must not have data in blocks that are shared with any other file. Any file specified by a $DFS_associate command that has data in any shared block is not included in the set and is not designated as an associated file.

A file is designated as being part of an associated set by fields in the File Index Table record, a table maintained in the DFS memory management 192 of data groups associated with a host file, for the file. If an active block for a non-associated file selected for allocation contains data for any file that is an associated file, another block is selected in its place. An active block to be allocated for an associated file should be restricted to partial blocks containing data for one or more files with which the file is associated. If no partial block exists within this restriction, all file associations are removed between files in the associated set, and any partial block is selected.

Figure 17:
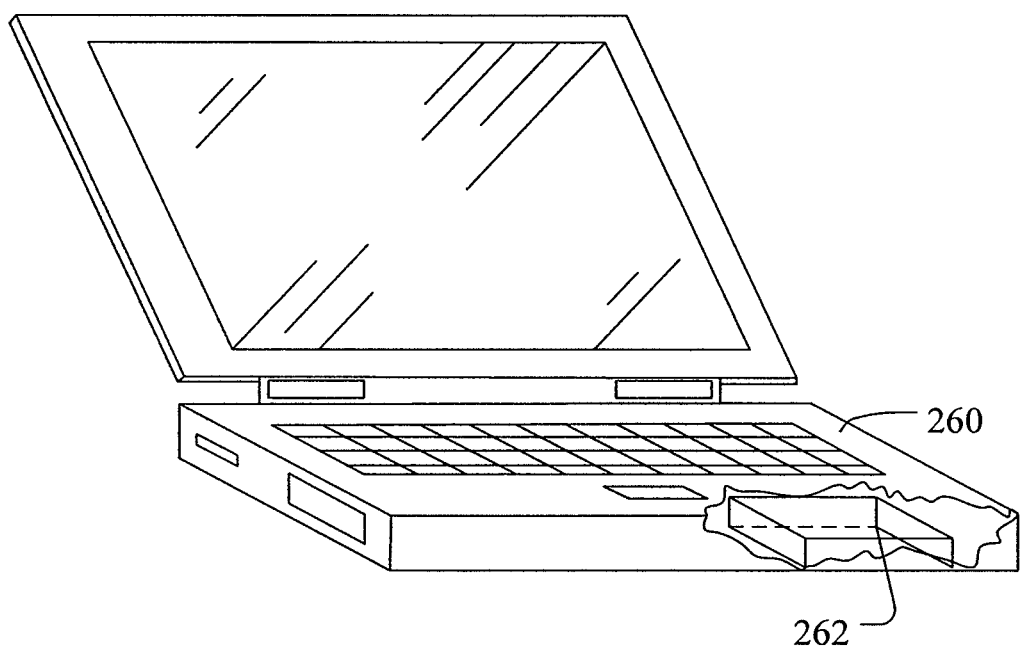
FIG. 17 is a sectional view of a laptop computer containing a solid state disk drive suitable for implementing the methods and systems described herein.

The description above is directed primarily to the example of a host system with a logical address space interface and a flash memory system with a file based memory management system communicating with each other. Other forms of flash memory such as solid state disks may use this technique and structure. As shown in FIG. 17, a laptop computer 260 may incorporate a built-in solid state disk (SSD) 262 comprised of flash-based memory that incorporates the DFS storage abilities and LBA to DFS interface module 186 noted above. An SSD 262 may provide advantages over a typical hard disk drive, such as lower power consumption, smaller size, quieter operation, and faster read and write speeds. Because an SSD 262 may have a limited number of write cycles, SSDs 262 using DFS memory management may provide increased durability for the flash memory due to efficiencies in data storage as discussed above. An LBA to DFS interface adapter 194, such as described above, integrated into an SSD 262 with DFS capabilities may provide advantages in durability of the flash memory media regardless of whether the laptop 260 or other host includes an operating system configured for taking full advantage of the DFS capabilities. Also, the techniques described herein may work with a wide variety of data storage systems in addition to flash memory, such as magnetic disk drives, optical disk drives, dynamic read-only-memory (DRAM), static read-only-memory (SRAM), read-only memory (ROM), semiconductor magnetic memory, and the like.

From the foregoing, a method and apparatus for implementing interfacing a host system having a logical address space file system with a file-based direct file storage memory system has been described. Although the host system does not know how the data is stored in the memory system and requires that the memory system understand legacy LBA address requests, an interface module in the memory system mediates between the host and the back-end of the memory system to translate the address formats and preferably does so in a manner that correlates the LBA addresses of the host to the application files the data pertains to.

It is therefore intended that the foregoing detailed description be regarded as illustrative rather than limiting, and that it be understood that it is the following claims, including all equivalents, that are intended to define the spirit and scope of this invention.

The invention claimed is:

1. A method of transferring data between a host system and a discrete re-programmable non-volatile mass storage device coupled to the host system, the method comprising:
   in the discrete re-programmable non-volatile mass storage device:
      receiving data associated with addresses in a logical block address (LBA) format from the host system;
      correlating a group of data within the data received in LBA format at the discrete mass storage device to an application file on the host system;
      assembling the group of data within the data received in LBA format at the discrete mass storage device from the host system based on the correlation of the group of data received in LBA format at the discrete mass storage device to the application file on the host system; and
   mapping LBA addresses for the group of data to offset addresses within a data object identified by a unique filename.

2. The method of claim 1, further comprising directly translating the group of data identified by the unique filename and offset addresses into physical addresses of blocks of memory cells.

3. The method of claim 1, further comprising receiving correlation information from the host regarding a relation of received data to the application file.

4. The method of claim 3, wherein receiving correlation information comprises receiving a host system file identifier from the host system.

5. The method of claim 4, wherein the host system file identifier is received with a file tagging command from the host system.

6. The method of claim 5, wherein the file tagging command and the host system file identifier are received prior to receiving data associated with LBA format addresses.

7. The method of claim 4, further comprising updating a host system file identifier table comprising a mapping of the host system file identifier to the unique filename.

8. The method of claim 7, comprising storing the host system file identifier table in volatile memory in the discrete mass storage device.

9. The method of claim 1, further comprising analyzing activity of a host system operating system to determine the correlation of the group of data to the application file on the host system.

10. The method of claim 9, wherein analyzing the host system operating system activity comprises observing host operating system activity detectable at an interface of the discrete mass storage device and, if a predetermined sequence of operating system activity is recognized, analyzing pre-data write activity to determine a correlation of LBA data to be written by the host to an application file in the host.

11. The method of claim 1, further comprising analyzing LBA addresses or address sequences of the received data and determining the correlation based at least in part on LBA address transition information.

12. The method of claim 1, further comprising the discrete mass storage device analyzing preceding write operations by the host system to LBA addresses associated with directory or FAT data and determining the correlation based at least in part on write activity to the directory or FAT LBA addresses.

13. The method of claim 1, further comprising the discrete mass storage device analyzing LBA addresses or address sequences, and preceding write operations by the host system to LBA addresses associated with directory or FAT data, and determining the correlation based on LBA address transition information and write activity to the directory or FAT LBA addresses.

14. The method of claim 1, further comprising assigning a file separator status to a detected transition between a sequence of read or write operations of file metadata from the host system and determining the correlation as coextensive with a sequence of data received between successive detected transitions between the sequence of read or write operations of file metadata.

15. The method of claim 1, further comprising:
   selecting, based on information from the host system, a correlation method to determine a correlation of data received in LBA format to host system application files from a plurality of correlation methods for determining a correlation of data received in LBA format to host system application files.

16. The method of claim 1, wherein the discrete re-programmable non-volatile mass storage device is a flash memory card.

17. A method of transferring data between a host system and a discrete re-programmable non-volatile mass storage device coupled to the host system, the method comprising:
   in the discrete re-programmable non-volatile mass storage device:
      receiving data associated with addresses in a logical block address (LBA) format from the host system;
      selecting, based on information from the host system, a correlation method to determine a correlation of data received in LBA format at the discrete mass storage device to host system application files from a plurality of correlation methods for determining a correlation of data received in LBA format at the discrete mass storage device to host system application files;
      correlating a group of the data received in LBA format at the discrete mass storage device to a host system application file using the selected correlation method; and
      mapping LBA addresses for the group of data to offset addresses within a data object identified by the unique filename.

18. The method of claim 17, further comprising directly translating data represented by the unique filename and data offset into physical addresses of blocks of memory cells in the discrete mass storage device.

19. The method of claim 17, further comprising receiving correlation information from the host regarding a relation of received data to the host system application file.

20. The method of claim 19, wherein receiving correlation information comprises receiving a host system file identifier from the host system.

21. The method of claim 20, wherein the host system file identifier is received with a file tagging command from the host system.

22. The method of claim 21, wherein the file tagging command and the host system file identifier are received prior to receiving data associated with LBA format addresses.

23. The method of claim 17, wherein the discrete re-programmable non-volatile mass storage device is a flash memory card.

24. A method of transferring data between a host system and a discrete re-programmable non-volatile mass storage device coupled to the host system, the method comprising:

in the discrete re-programmable non-volatile mass storage device:
receiving data associated with addresses in a logical block address (LBA) format from the host system;
determining whether there is a correlation between a group of the data received in LBA format at the discrete mass storage device and a host system application file;
correlating the group of data received in LBA format at the discrete mass storage device to the host system application file when it is determined that there is a correlation between the group of the data received in LBA format at the discrete mass storage system and the host system application file;
assigning a unique file name to the group of the data received in LBA format at the discrete mass storage device when the correlation is determined and mapping LBA addresses for the group of data to the unique file name and a data offset; and
assigning the unique file name to a contiguous range of LBA addresses in the received data when the correlation is not determined and mapping the contiguous range of LBA addresses to the unique file name and a data offset.

25. The method of claim 24, further comprising:
selecting, based on information from the host system, a correlation method to determine a correlation of data received in LBA format to host system application files from a plurality of correlation methods for determining a correlation of data received in LBA format to host system application files.

26. The method of claim 24, wherein the discrete re-programmable non-volatile mass storage device is a flash memory card.

27. A method of transferring data between a host system and a discrete re-programmable non-volatile mass storage device coupled to the host system, the method comprising:
in the discrete re-programmable non-volatile mass storage device:
determining whether the host system is configured to provide host system file identifiers to the discrete mass storage device prior to writing logical block address (LBA) format data to the discrete mass storage device, wherein the host system file identifiers indicate to the discrete mass storage device a correlation of subsequently transmitted LBA data to application files on the host system;
when the host system is configured to provide host system file identifiers to the discrete mass storage device:
receiving a group of data associated with addresses in a logical block address (LBA) format and a host system file identifier from the host system;
mapping the host system file identifier to a unique file name; and
mapping BA addresses for the data received in LBA format at the discrete mass storage device to offset addresses in a data object identified by a unique filename; and
when the host system is not configured to provide host system file identifiers to the discrete mass storage device:
automatically correlating received LBA format data to application files on the host system without host system file identifiers;
assigning a unique filename to a group of data received in LBA format determined to correlate to an application file; and
mapping LBA addresses for the data received in LBA format at the discrete mass storage device to offset addresses in a data object identified by a unique filename.

28. The method of claim 27, wherein automatically correlating received LBA format data further comprises analyzing activity of a host system operating system to determine the correlation of the group of data to the application file on the host system.

29. The method of claim 28, wherein analyzing the host system operating system activity comprises observing host operating system activity detectable at an interface of the mass storage system and, if a predetermined sequence of operating system activity is recognized, analyzing pre-data write activity to determine a correlation of LBA data to be written by the host to an application file in the host.

30. The method of claim 27, wherein automatically correlating received LBA format data further comprises analyzing LBA addresses or address sequences of the received data and determining the correlation based at least in part on LBA address transition information.

31. The method of claim 27, wherein automatically correlating received LBA format data further comprises the mass storage system analyzing preceding write operations by the host system to LBA addresses associated with directory or FAT data and determining the correlation based at least in part on write activity to the directory or FAT LBA addresses.

32. The method of claim 27, wherein automatically correlating received LBA format data further comprises the mass storage system analyzing LBA addresses or address sequences, and preceding write operations by the host system to LBA addresses associated with directory or FAT data, and determining the correlation based on LBA address transition information and write activity to the directory or FAT LBA addresses.

33. The method of claim 27, wherein automatically correlating received LBA format data further comprises assigning a file separator status to a detected transition between a sequence of read or write operations of file metadata from the host system and determining the correlation as coextensive with a sequence of data received between successive detected transitions between the sequence of read or write operations of file metadata.

34. The method of claim 27, wherein the discrete re-programmable non-volatile mass storage device is a flash memory card.

35. A discrete mass storage memory device, comprising:
re-programmable non-volatile memory cells, the memory cells being arranged in a plurality of blocks of memory cells that are erasable together;
an interface adapted to receive data addressed in a logical block address (LBA) format from a host system;
a controller in communication with the interface, the controller comprising processor executable instructions for executing the steps of:
determining if there is a correlation between a group of the data received in LBA format at the discrete mass storage memory device and a host system application file;
correlating the group of data received in LBA format at the discrete mass storage memory device to the host system application file when it is determined that there is a correlation between the group of data received in LBA format at the discrete mass storage memory device and the host system application file; and translating LBA addresses of the group of data into offset addresses within a file object identified by a unique file identifier when it is determined that there is a correlation between the group of data received in LBA format at the discrete mass storage memory device and the host system application file.

36. The discrete mass storage memory device of claim 35, wherein the processor executable instructions further comprise instructions for translating a contiguous range of LBA addresses in the received data into a file object identified by a unique file identifier if the correlation is not determined.

37. The discrete mass storage memory device of claim 35, wherein the processor executable instructions for determining if there is a correlation further comprises instructions for receiving a host system file identifier from the host system prior to receiving the group of the received data.

38. The discrete mass storage memory device of claim 37, further comprising a host system file identifier table and processor executable instructions for mapping into the host system file identifier table the received host file identifier and the unique file identifier.

39. The discrete mass storage memory device of claim 38, wherein the host system file identifier table is located in a volatile memory in the mass storage system.

40. The discrete mass storage memory device of claim 35, wherein the processor executable instructions further comprise instructions for analyzing activity of a host operating system to determine the correlation of the group of data to the host system application file.

41. The discrete mass storage memory device of claim 35, wherein the processor executable instructions further comprise instructions for analyzing LBA addresses or address sequences of the received data and determining the correlation based at least in part on LBA address transition information.

42. The discrete mass storage memory device of claim 35, wherein the processor executable instructions further comprise instructions for analyzing preceding write operations by the host system to LBA addresses associated with directory or file allocation table ("FAT") data and determining the correlation based at least in part on write activity to the directory or FAT LBA addresses.

43. The discrete mass storage memory device of claim 35, wherein the processor executable instructions further comprise instructions for analyzing LBA addresses or address sequences, and preceding write operations by the host system to LBA addresses associated with directory or file allocation table ("FAT") data, and determining the correlation based on LBA address transition information and write activity to the directory or FAT LBA addresses.

44. The discrete mass storage memory device of claim 35, wherein the processor executable instructions further comprise instructions for assigning a file separator status to a detected transition between a sequence of read or write operations of file metadata from the host system and determining the correlation as coextensive with a sequence of data received between successive detected transitions between the sequence of read or write operations of file metadata.

45. A discrete mass storage memory device, comprising:
re-programmable non-volatile memory cells, the memory cells being arranged in a plurality of blocks of memory cells that are erasable together;
an interface adapted to receive data addressed in a logical block address (LBA) format from a host system;
a controller in communication with the interface, the controller configured to determine if the host system is arranged to provide information to the discrete mass storage device that is sufficient for the controller to determine a correlation of data received in LBA format at the discrete mass storage memory device to host system application files, and when the host system is so arranged, to correlate groups of data received in LBA format at the discrete mass storage memory device to host system application files and to assign a unique file name to each group of received data correlated to a respective host system application file, and for each group of data received in LBA format at the discrete mass storage memory device correlated to a host system application file, to map LBA addresses for the group of data to the unique file name and a data offset.

46. The discrete mass storage memory device of claim 35, wherein the controller further comprises processor executable instructions for executing the step of:
selecting, based on information from the host system, a correlation method to determine a correlation of data received in LBA format to host system application files from a plurality of correlation methods for determining a correlation of data received in LBA format to host system application files.

47. The discrete mass storage memory device of claim 35, wherein the discrete mass storage memory device is a flash memory card.

48. The discrete mass storage memory device of claim 45, wherein the controller is further configured to receive correlation information from the host regarding a relation of the received data to the host system application file.

49. The discrete mass storage memory device of claim 48, wherein the correlation information comprises a host system file identifier.

50. The discrete mass storage memory device of claim 49, wherein correlation information further comprises a file tagging command associated with the host system file identifier.

51. The discrete mass storage memory device of claim 45, wherein the controller is further configured to assign the unique file name to a contiguous range of LBA addresses in the received data and map the contiguous range of LBA addresses to the unique file name and a data offset if the controller determines that the host system is not arranged to provide information sufficient for the controller to determine a correlation of received data to host system application files.

52. The discrete mass storage memory device of claim 40, wherein the processor executable instructions further comprise instructions for observing host operating system activity detectable at an interface of the discrete mass storage memory device and, if a predetermined sequence of operating system activity is recognized, analyzing pre-data write activity to determine a correlation of LBA format data to be written by the host to an application file in the host.

53. The discrete mass storage memory device of claim 45, wherein the controller is further configured to select, based on information from the host system, a correlation method to determine a correlation of data received in LBA format to host system application files from a plurality of correlation methods for determining a correlation of data received in LBA format to host system application files.

54. The discrete mass storage memory device of claim 45, wherein the discrete mass storage memory device is a flash memory card.

55. A discrete mass storage memory device, comprising:
re-programmable non-volatile memory cells, the memory cells being arranged in a plurality of blocks of memory cells that are erasable together;
an interface adapted to receive data addressed in a logical block address (LBA) format from a host system;

a controller in communication with the interface, the controller configured to determine whether there is a correlation between a group of the data received in LBA format at the discrete mass storage memory device and a host system application file, to correlate the group of data received in LBA format at the discrete mass storage memory device to the host system application file when it is determined that there is a correlation between the group of data received in LBA format and the host system application file, to assign a unique file name to the group of data when the correlation is determined, and to map LBA addresses for the group of data to the unique file name and a data offset, and wherein the controller is further configured to assign the unique file name to a contiguous range of LBA addresses in the received data and map the contiguous range of LBA addresses to the unique file name and a data offset when it is not determined that there is a correlation between the group of data received in LBA format and the host system application file.

56. The discrete mass storage memory device of claim 55, wherein the controller is further configured to select, based on information from the host system, a correlation method to determine a correlation of data received in LBA format to host system application files from a plurality of correlation methods for determining a correlation of data received in LBA format to host system application files.

57. The discrete mass storage memory device of claim 55, wherein the discrete mass storage memory device is a flash memory card.

58. A discrete mass storage memory device comprising:
re-programmable non-volatile memory cells, the memory cells being arranged in a plurality of blocks of memory cells that are erasable together;
an interface adapted to receive data from a host system, the data addressed in a logical block address (LBA) format; and
a controller in communication with the interface, the controller configured to correlate LBA addresses of data received at the discrete mass storage device from the host system to a host system application file, to create a file object for correlated received data wherein the file object is identified by a unique file identifier and an offset, and to cause the file object to be stored in one or more of the plurality of blocks of memory cells;
wherein the controller comprises at least two correlation routines for correlating data received in LBA format at the discrete mass storage device to host system application files and is configured to implement a first correlation routine in response to a determination that the host system is capable of providing host application file identifiers associated with the data received in LBA format to the memory system to the discrete mass storage device and is configured to implement a second correlation routine if the host system is incapable of providing host system application file identifiers associated with data received in LBA format to the discrete mass storage device, the host system file identifiers indicating to the discrete mass storage memory device a correlation of subsequently transmitted LBA data to application files on the host system.

59. The discrete mass storage memory device of claim 58, wherein the second correlation routine comprises instructions for the controller to analyze activity of a host operating system to determine a correlation of LBA format data to the host system application file.

60. The discrete mass storage memory device of claim 58, wherein the second correlation routine comprises instructions for the controller to observe host operating system activity detectable at the interface, and if a predetermined sequence of operating system activity is recognized, to analyze pre-data write activity to determine a correlation of LBA format data to be written by the host to the host system application file.

61. The discrete mass storage memory device of claim 58, wherein the second correlation routine comprises instructions for the controller to analyze LBA addresses or address sequences of data received and determine the correlation based at least in part on LBA address transition information.

62. The discrete mass storage memory device of claim 58, wherein the second correlation routine comprises instructions for the controller to analyze preceding write operations by the host system to LBA addresses associated with directory or file allocation table ("FAT") data and determine a correlation with the host system application file based at least in part on write activity to the directory or FAT LBA addresses.

63. The discrete mass storage memory device of claim 58, wherein the second correlation routine comprises instructions for the controller to analyze LBA addresses or address sequences, and preceding write operations by the host system to LBA addresses associated with directory or file allocation table ("FAT") data, and determine a correlation based on LBA address transition information and write activity to the directory or FAT LBA addresses.

64. The discrete mass storage memory device of claim 58, wherein the second correlation routine comprises instructions for the controller to assign a file separator status to a detected transition between a sequence of read or write operations of file metadata from the host system and determine a correlation as coextensive with a sequence of data received between successive detected transitions between the sequence of read or write operations of file metadata.

65. The discrete mass storage memory device of claim 58, wherein the discrete mass storage memory device is a flash memory card.

* * * * *

UNITED STATES PATENT AND TRADEMARK OFFICE
CERTIFICATE OF CORRECTION

| | | |
|---|---|---|
| PATENT NO. | : 8,713,283 B2 | Page 1 of 1 |
| APPLICATION NO. | : 11/760469 | |
| DATED | : April 29, 2014 | |
| INVENTOR(S) | : Alan W. Sinclair | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 959 days.

Signed and Sealed this
Twenty-first Day of July, 2015

Michelle K. Lee
*Director of the United States Patent and Trademark Office*